(12) United States Patent
Tarighat Mehrabani

(10) Patent No.: US 11,166,222 B2
(45) Date of Patent: Nov. 2, 2021

(54) COMMUNICATION BY A REPEATER SYSTEM INCLUDING A NETWORK OF RADIO FREQUENCY (RF) REPEATER DEVICES

(71) Applicant: AR & NS Investment, LLC, Newport Coast, CA (US)

(72) Inventor: Alireza Tarighat Mehrabani, Los Angeles, CA (US)

(73) Assignee: AR & NS INVESTMENT, LLC, Newport Coast, CA (US)

( * ) Notice: Subject to any disclaimer, the term of this patent is extended or adjusted under 35 U.S.C. 154(b) by 0 days.

(21) Appl. No.: 16/983,607

(22) Filed: Aug. 3, 2020

(65) Prior Publication Data

US 2021/0037447 A1 Feb. 4, 2021

Related U.S. Application Data

(60) Provisional application No. 62/914,664, filed on Oct. 14, 2019, provisional application No. 62/882,309, filed on Aug. 2, 2019.

(51) Int. Cl.
*H04W 40/24* (2009.01)
*H04W 84/04* (2009.01)

(52) U.S. Cl.
CPC ........ *H04W 40/248* (2013.01); *H04W 84/047* (2013.01)

(58) Field of Classification Search
CPC .......................... H04W 40/248; H04W 84/047
See application file for complete search history.

(56) References Cited

U.S. PATENT DOCUMENTS

| 6,400,968 | B1* | 6/2002 | White | G08C 17/02 |
| | | | | 455/572 |
| 9,294,162 | B2* | 3/2016 | Nilsson | H04W 16/26 |
| 9,715,031 | B2* | 7/2017 | Contant | G01V 3/30 |
| 10,308,221 | B2* | 6/2019 | Kim | B60R 25/24 |
| 2002/0008629 | A1* | 1/2002 | Jinno | G08G 1/097 |
| | | | | 340/642 |
| 2005/0083905 | A1* | 4/2005 | Nishida | H04L 29/06 |
| | | | | 370/351 |
| 2006/0133822 | A1* | 6/2006 | Manna | H04B 10/2935 |
| | | | | 398/173 |
| 2007/0161347 | A1* | 7/2007 | Ma | H04B 7/18506 |
| | | | | 455/11.1 |

(Continued)

*Primary Examiner* — Dominic E Rego
(74) *Attorney, Agent, or Firm* — Chip Law Group

(57) ABSTRACT

A repeater system includes a first RF repeater device arranged in a first topology of a network of RF repeater devices, to communicate with one or more second RF repeater devices in the network of RF repeater devices to service a source node and destination nodes in a wireless network. The first RF repeater device detects a change in a network condition in wireless network between source node and the destination nodes. Based on the detected change in network condition, the one or more second RF repeater devices are controlled in network of RF repeater devices to re-configure the first topology of network of RF repeater devices to a second topology. The re-configuration of first topology of network of RF repeater devices to second topology is executed to continue to service source node and the destination nodes in the wireless network in the changed network condition.

20 Claims, 22 Drawing Sheets

(56) References Cited

U.S. PATENT DOCUMENTS

| | | | | |
|---|---|---|---|---|
| 2008/0013459 A1* | 1/2008 | Do | ............ | H04W 40/12 |
| | | | | 370/248 |
| 2011/0107189 A1* | 5/2011 | Park | ............ | H04L 1/08 |
| | | | | 714/790 |
| 2011/0223855 A1* | 9/2011 | Frenger | ............ | H04W 52/46 |
| | | | | 455/9 |
| 2012/0286967 A1* | 11/2012 | Alteirac | ............ | E21B 47/12 |
| | | | | 340/853.7 |
| 2017/0085313 A1* | 3/2017 | Stationwala | ............ | H04B 7/15592 |
| 2017/0203619 A1* | 7/2017 | Gow | ............ | B60C 23/0462 |
| 2017/0215190 A1* | 7/2017 | Chung | ............ | H04B 7/18508 |
| 2017/0230107 A1* | 8/2017 | Roy | ............ | H04B 7/15507 |
| 2017/0288766 A1* | 10/2017 | Cook | ............ | H04B 7/15535 |
| 2017/0347383 A1* | 11/2017 | Liu | ............ | H04W 76/10 |
| 2018/0110003 A1* | 4/2018 | Jang | ............ | H04W 76/28 |
| 2018/0139680 A1* | 5/2018 | Hui | ............ | H04L 45/122 |
| 2019/0049130 A1* | 2/2019 | Berg | ............ | F24F 11/83 |
| 2019/0117123 A1* | 4/2019 | Tan | ............ | A61B 5/742 |
| 2019/0222258 A1* | 7/2019 | Bohls | ............ | H04L 25/20 |
| 2019/0327625 A1* | 10/2019 | Patel | ............ | H04W 16/26 |
| 2020/0047715 A1* | 2/2020 | Park | ............ | B60R 25/209 |
| 2020/0280355 A1* | 9/2020 | Abedini | ............ | H04W 16/28 |

* cited by examiner

COMMUNICATION BY A REPEATER SYSTEM INCLUDING A NETWORK OF RADIO FREQUENCY (RF) REPEATER DEVICES

CROSS-REFERENCE TO RELATED APPLICATIONS/INCORPORATION BY REFERENCE

This Application makes reference to, claims priority to, and claims benefit from U.S. Provisional Application Ser. No. 62/882,309, which was filed on Aug. 2, 2019, and further from U.S. Provisional Application Ser. No. 62/914,664, which was filed on Oct. 14, 2019.

Each of the above referenced Applications is hereby incorporated herein by reference in its entirety.

FIELD OF TECHNOLOGY

Certain embodiments of the disclosure relate to wireless telecommunication systems. More specifically, certain embodiments of the disclosure relate to communication by a repeater system including a network of radio frequency (RF) repeater devices.

BACKGROUND

Wireless telecommunication in modern times has witnessed the advent of various signal transmission techniques and methods, such as use of beam forming and beam steering techniques, for enhancing capacity of radio channels. In accordance with such techniques, a transmitter radiates radio waves in form of beams of radio frequency (RF) signals to a variety of RF receiver devices. The conventional systems which use techniques such as beamforming and beam steering for signal transmission may have one or more limitations. For example, a beam of RF signals transmitted by conventional systems, may be highly directional in nature and may be limited in transmission range or coverage.

In certain scenarios, an RF receiver device may be situated at a distance which is beyond transmission range of the transmitter, and hence reception of the RF signal at the RF receiver device may be adversely affected. In other scenarios one or more obstructions (such as buildings and hills) in path of the RF beam transmitted by the transmitter, may be blocking reception of the RF signal at the RF receiver device. For the advanced high-performance communication networks, such as the millimeter wave communication system, there is required a dynamic system that can overcome the one or more limitations of conventional systems. Moreover, the number of end-user devices, such as wireless sensors and IoT devices are rapidly increasing with the increase in smart homes, smart offices, enterprises, etc. Existing communication systems are unbale to handle such massive number of wireless sensors and IoT devices and their quality-of-service (QoS) requirements. In such cases, it is extremely difficult and technically challenging to support these end user devices in order to meet data communication in multi-gigabit data rate. Moreover, latency and unreliable data communication resulting in erroneous data recovery at the destination node are other technical problem with existing communication systems and network architecture.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A repeater system and methods for communication by a repeater system including a network of RF repeater devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a repeater system and method for communication by a repeater system including a network of RF repeater devices. The repeater system and method of the present disclosure not only improves data transfer rates between at least two network nodes as compared to existing wireless communication systems (e.g. a wireless network or other wireless networks), but also enables almost near zero latency communication and an always-connected experience even in changing network conditions (and environment conditions). The repeater system may deploy a network of RF repeater devices, which may be configured to perform distributed multiple-input multiple-output (MIMO) operations, and enhance the wireless communication capacity, coverage, and reliability between a source network node and a destination network node, for high-performance wireless communication. In the following description, reference is made to the accompanying drawings, which form a part hereof, and in which is shown, by way of illustration, various embodiments of the present disclosure.

Figure 1A:
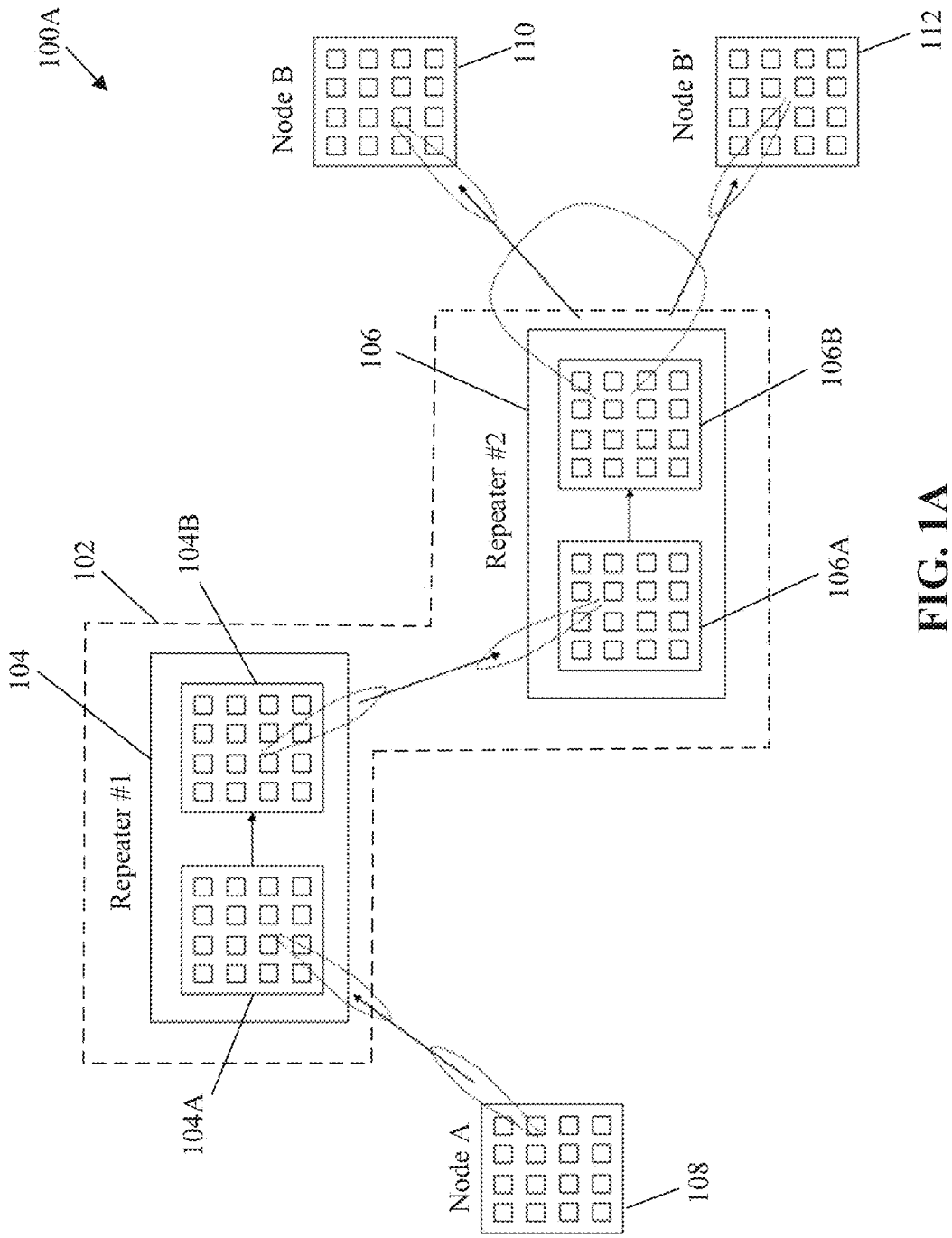
FIG. 1A is a network environment of a communication system with a repeater system in a first configuration, in accordance with an exemplary embodiment of the disclosure.

FIG. 1A is a network environment of a communication system with a repeater system in a first configuration, in accordance with an exemplary embodiment of the disclosure. With reference to FIG. 1A, there is shown a communication system 100A that may include a repeater system 102. The repeater system 102 may include a network of RF repeater devices, such as a first RF repeater device 104 and a second RF repeater device 106, configured (i.e. networked) in a first topology (or in a first configuration). In this embodiment, the first repeater device 104 may include a first antenna array 104A and a second antenna array 104B. The second repeater device 106 may include a third antenna array 106A and a fourth antenna array 106B. The communication system 100A may further include a source node 108 (e.g. Node A) and one or more destination nodes, such as a first destination node 110 (e.g. Node B) and a second destination node 112 (e.g. Node B').

The repeater system 102 may include a network of RF repeater devices, such as the first RF repeater device 104 deployed at a first location and the second RF repeater device 106 deployed at a second location. Each of the network of RF repeater devices, such as the first RF repeater device 104 and the second RF repeater device 106, includes suitable logic, circuitry, and interfaces that may be configured to communicate with the source node 108 (i.e. the Node A) and the one or more destination nodes, such as the first destination node 110 (e.g. Node B) and the second destination node 112 (e.g. Node B'). The repeater system 102 enables data communication in a multi-gigabit data rate. In accordance with an embodiment, the repeater system 102 may support multiple and a wide range of frequency spectrum, for example, 2G, 3G, 4G, and 5G (including out-of-band frequencies). Examples of the each of the network of RF repeater devices of the repeater system 102 may include, but is not limited to, a 5G wireless access point, a multi-protocol wireless range extender device, an evolved-universal terrestrial radio access-new radio (NR) dual connectivity (EN-DC) device, a NR-enabled RF repeater device, a wireless local area network (WLAN)-enabled device, or a wireless personal area network (WPAN)-enabled device, a MIMO-capable RF repeater device, or a combination thereof.

The source node 108 includes suitable logic, circuitry, and interfaces that may be configured to communicate with the one or more destination nodes, such as the first destination node 110 (e.g. Node B) and the second destination node 112 (e.g. Node B'), via the network of RF repeater devices configured in a first topology. Examples of the source node 108 may include, but is not limited to, a base station (e.g. an Evolved Node B (eNB) or gNB), a small cell, a remote radio unit (RRU), or other network nodes or communication device provided in a wireless network.

Each of the first destination node 110 (e.g. Node B) and the second destination node 112 includes suitable logic, circuitry, and interfaces that may be configured to communicate with the source node 108, via the network of RF repeater devices in the first topology. Examples of the first destination node 110 and the second destination node 112 may include, but is not limited to, a smartphone, a customer-premises equipment (CPE), a wireless modem, a user equipment, a virtual reality headset, an augment reality device, an in-vehicle device, a home router, a cable or satellite television set-top box, a VoIP base station, or any other customized hardware for telecommunication.

In operation, the first RF repeater device 104 may be arranged in a first topology of the network of RF repeater devices and is configured to communicate with one or more second RF repeater devices (e.g. the second destination node 112) in the network of RF repeater devices to service the source node 108 and the one or more destination nodes (e.g. the first destination node 110 and the second destination node 112) in a wireless network (e.g. a 5G NR, a true 5G, or upcoming 6G network). The first RF repeater device 104 is further configured to detect a change in a network condition in the wireless network between the source node 108 and the one or more destination nodes (e.g. the first destination node 110 and the second destination node 112).

In accordance with an embodiment, the change in the network condition in the wireless network may be triggered by a plurality of events, such as a blockage of one or more communication links in the wireless network, a movement of the source node 108 or the one or more destination nodes, a movement of one or more RF repeater devices that are mobile in the network of RF repeater devices, a change in the number of nodes (e.g. source and destination nodes), in the wireless network to be serviced, or a change in a demand (or requirements) for a throughput, a quality-of-service, or a quality-of-experience.

Moreover, based on the detected change in the network condition, the first RF repeater device 104 is further configured to control the one or more second RF repeater devices (e.g. the second RF repeater device 106) in the network of repeater devices to re-configure the first topology of the network of repeater devices to a second topology. For example, in this embodiment (as shown in FIG. 1A), the first repeater device 104 and the second repeater device 106 (i.e. repeaters #1 and #2) may be configured to operate in a cascaded (multi-hope mode), where a single beam from the source node 108 (i.e. the node A) is utilized and the first destination node 110 and the second destination node 112 (i.e. nodes B and B') are serviced by the same repeater node, such as the second RF repeater device 106 (repeater #2). Thus, in case of any change in the network condition (or environment condition), the re-configuration may be executed. The re-configuration of the first topology of the network of RF repeater devices to the second topology is executed at least to continue to service the source node 108 and the one or more destination nodes in the wireless network in the changed network condition. In an example, this re-configuration may be triggered by blockage of a link between the second RF repeater device 106 (i.e. repeater #2) and the second destination node 112 (i.e. node B) (shown in FIG. 1B).

In accordance with an embodiment, the first repeater device 104 is further configured to modify a form of connectivity between the source node 108 and the network of repeaters in the re-configuration of the first topology of the network of repeater devices to the second topology. For example, a cascaded multi-hop repeater configuration may be dynamically (i.e. in real time or near real time or in some delay time) re-configured to operate as single-hop repeater links. The first repeater system 102 may be further configured to change an allocation of the first RF repeater device 104 or the one or more second RF repeater devices (e.g. the second RF repeater device 106) to the one or more destination nodes (e.g. the first destination node 110 and the second destination node 112) in the re-configuration of the first topology of the network of RF repeater devices to the second topology. Alternatively, the first RF repeater device 104 may be further configured to change an allocation of the first RF repeater device 104 or the one or more second (other) RF repeater devices to the source node 108 in the re-configuration of the first topology of the network of RF repeater devices to the second topology. In another example, the first RF repeater device 104 may be further configured to modify a number of beams allocated to the first RF repeater device 104, the one or more second RF repeater devices in the network of RF repeater devices, the source node 108, or the one or more destination nodes in the re-configuration of the first topology of the network of RF repeater devices to the second topology. Alternatively stated, as a change in topology of network of repeaters, the following characteristics may be modified: A) Form of connectivity between a given source node (e.g. the source node 108) and a set of RF repeater devices (e.g. the network of RF repeater devices); B) Assignment (allocation, association) of nodes to the RF repeater devices in the network of RF repeater devices may be re-configured; or C) Number of beams/streams allocated to repeaters/nodes may be re-configured.

For the sake of brevity, the aforementioned implementations (and embodiments) are described with two repeaters in the repeater system 102. However, it is to be understood by a person of ordinary skill in the art that such implementations and embodiments can be extended to cover cases of N beams/streams transmitted out of source node 108 (i.e. node A), and N repeaters utilized in the network environment, and the first destination node 110 (i.e. node B) or the second destination node 112, using P beams for receiving signals from the N repeaters.

In another aspect of the present disclosure, the repeater system 102 may be configured to use a plurality of phased antenna arrays, which may be configured to receive signals from a plurality of source devices (instead of one network node) and re-transmit the received signals to a plurality of destination devices. In a first example, the first RF repeater device 104 may use a single antenna array, which may be configured to receive and transmit multiples beams and/or streams through the same antenna array. In this case, the first RF repeater device 104 may receive streams/beams from a plurality of source devices, concurrently, while re-transmitting those streams through a plurality of beams to the plurality of destination devices. In some embodiments, the first RF repeater device 104 may be configured to receive data streams from a single source node (i.e. the source node 108), while re-transmitting signals to multiple destination devices. In another embodiment, the first RF repeater device 104 may be configured to receive streams S1 and S2 from multiple source devices (where these streams may contain the same information bits, or independent information bits) and re-transmit these streams to a single destination device, such as the first destination node 110.

In another example, the first RF repeater device 104 may use different physical antenna arrays in order to receive and transmit beams/streams. Some antenna arrays may be used for transmitting data streams/beams, while other antenna arrays may be utilized for receiving data streams/beams. The first RF repeater device 104 may be configured to operate in: (1) a time-division duplex mode (TDD), where the first RF repeater device 104 is configured to relay or repeat signals from the source node 108 (i.e. node A) to first destination node 110 (i.e. node B) in T1 time interval, and the first RF repeater device 104 is reconfigured to relay or repeat signals from first destination node 110 (i.e. node B) to source node 108 (i.e. node A) in T2 time interval. The first RF repeater device 104 may be further configured to operate in: 2) a frequency-division duplex mode (FDD), where bi-directional links may be concurrently operating in different frequency channels. The first RF repeater device 104 may be further configured to operate in: 3) a full-duplex mode (FD), where a RF repeater device (such as the first RF repeater device 104) may be configured to relay or repeat the signals between the source node 108 (i.e. node A) and the first destination node 110 (i.e. node B), concurrently, in both direction, irrespective of presence of signals or not.

In another example, for each link direction, the first RF repeater device 104 may include the first antenna array 104A that is configured to receive the first beam of RF signal from the source node 108 (i.e. node A), and the second antenna array 104B that is configured to transmit the first beam of RF signal carrying first data stream to the first destination node 110 (i.e. node B). In this case, the RF signal exchange between these two antenna arrays may be: 1) in original RF frequency, where no frequency shift is applied to the signal; 2) in some intermediate frequency (IF) where the signal is shifted down to IF frequency before being routed from the first antenna array 104A to the second antenna array 104B; 3) in baseband I/Q domain, where the signal is down-converted (shifted in frequency) to zero frequency before being routed from first antenna array 104A to the second antenna array 104B; or 4) in digital domain, where the received signal is shifted down in frequency domain and digitized before being routed to the second antenna array 104B.

In some embodiments, each RF repeater device (such as the first RF repeater device 104 and/or the second RF repeater device 106) may not perform any decoding of received stream before re-transmitting it. This mode may be utilized when very low latency link is desired or required. In this embodiment, the received signal passing through a receiving antenna array (such as first antenna array 104A) may be shifted in frequency, amplified, filtered for out of channel noise, and transmitted at RF frequency through a transmitting antenna array (such as the second antenna array 104B) configured to a certain beam pattern. In some embodiments, each RF repeater device (such as the first RF repeater device 104 and/or the second RF repeater device 106) may digitize the received stream for some low-latency processing in digital domain (such as channel selection filtering, IQ correction), without demodulating the data stream. In some embodiments, where latency of demodulation and re-modulation of data stream can be afforded (i.e. acceptable), and/or the quality (i.e. the SNR) of the received stream is not sufficient for re-transmission as is, the RF repeater device (such as the first RF repeater device 104 and/or the second RF repeater device 106) may de-modulate, de-code, re-encode, re-modulate the stream before re-transmitting the stream through a transmitting antenna array (such as the second antenna array 104B).

In some embodiments, the receiving antenna array (e.g. the first antenna array 104A) and transmitting antenna array (e.g. the second antenna array 104B, or the fourth antenna array 106B) inside a RF repeater device (e.g. the first RF repeater device 104 or the second RF repeater device 106) operate at the same carrier RF frequency. In this case, no frequency shift is applied/observed between the incoming signal compared to the outgoing signal. In some embodiments, the carrier RF frequency of incoming and outgoing signals may be different. This embodiment may be utilized, for 1) better utilization of spectral channels, 2) better overall frequency planning in network, and/or 3) better isolation between the two antenna arrays inside the RF repeater device operating at same time/channel. In some embodiments, the antenna arrays in a RF repeater device of the repeater system 102 may deploy classic phase shifters per antenna element to create configurable or programmable antenna radiation patterns. In some embodiments, the antenna arrays may be implemented by other means of creating programmable phase shifts in RF signals per group of radiating elements of a given antenna array. In some embodiments, digital domain computations (e.g. complex multipliers (certain amplitude and certain phase of a signal) or true delay line implementations per radiating element may be deployed to produce directional and/or configurable radiation patterns.

In accordance with an embodiment, the repeater system 102 may be configured to perform beam pattern configuration. Each antenna array (either transmitting or receiving) within a RF repeater device (e.g. the first RF repeater device 104 or the second RF repeater device 106) may be further configured to select and form a radiation pattern from a plurality of possible beam patterns. In the case of simultaneous multi-beam mode of operation, each beam can be configured independently. Several approaches may be used for selecting the beam configurations for various links in/out of each RF repeater device of the repeater system 102. In a first approach, a localized beam configuration selection may be employed, in which a repeater device (e.g. the first repeater device 104 or the second repeater device 106) may implement operations self-contained within the repeater device to determine what beam configurations to use. For example, the first repeater device 104 may be configured to measure SNR or received signal power to select the best beam configuration when receiving signal from the source device, such as the source node 108.

In a second approach, link level beam configuration selection may be employed, in which a repeater device (e.g. the first repeater device 104 or the second repeater device 106) may be configured to use the link between the RF repeater device and one of the source node 108 (i.e. node A) or the first destination node 110 (i.e. node B) to train its beam selection for its receiving or transmitting array. For example, to select a beam configuration for the first antenna array 104A of the first RF repeater device 104 towards the source node 108 (i.e. node A), the first RF repeater device 104 may be configured to use one or more link metric measurements (such as SNR or received signal power) by the source node 108 (i.e. node A) to configure the beam of the second antenna array 104B of the first RF repeater device 104. In an implementation, the communication and exchange of measurements between each RF repeater device (e.g. the first RF repeater device 104 or the second RF repeater device 106) of the repeater system 102 and the source node 108 (i.e. node A) may be done using an out-of-band or an auxiliary link. For example, a Wi-Fi link or a Long-term Evolution (LTE) link may be used for coordination and exchange of messages between each RF repeater device and the source node 108 (i.e. node A). In another implementation, the exchange of measurements and training of beam selection process may be done using in-band communication (i.e. the same target link that is used for data transport between each RF repeater device of the repeater system 102 and the source node 108 (i.e. node A), is also used for training and selection of beam configuration).

In a third approach, a network level beam configuration selection may be performed, in which a master network node (e.g. a base station in the case of a wireless network, or a server in the cloud network) may be configured to acquire various information elements from the various network nodes in the network, and use all such data to select the beam configurations for different nodes and RF repeater devices of the repeater system 102 in the network. For example, the source node 108 (i.e. node A) may be configured to acquire measurement data from the first RF repeater device 104, the second RF repeater device 106, and the first destination node 110 (i.e. node B), and other possible destination nodes in the network. Thereafter, the source node 108 (i.e. node A) may be configured to process all acquired measurements jointly, and instruct the network nodes and the repeaters devices of the repeater system 102 in the network to use the selected beam configurations, respectively.

Figure 1B:
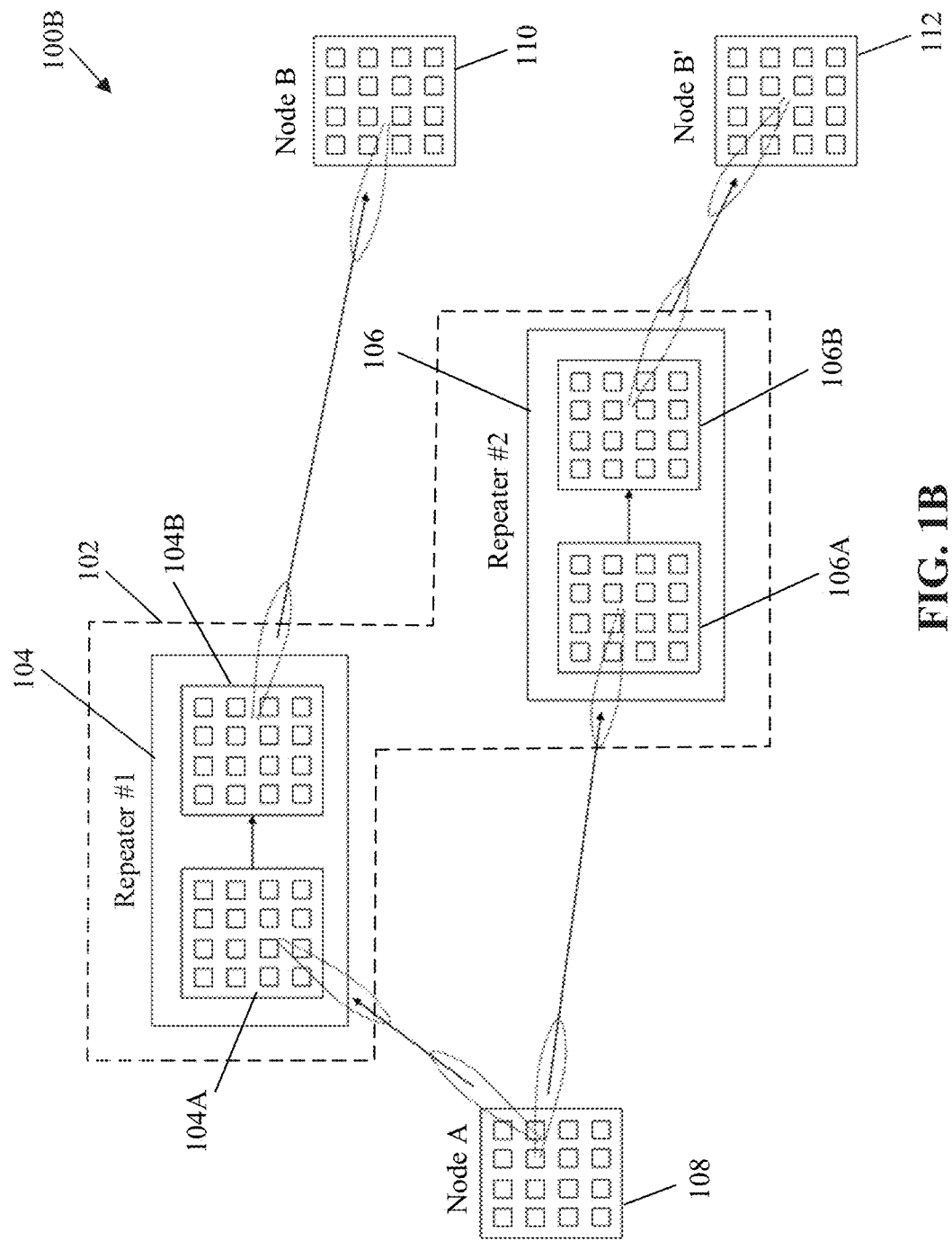
FIG. 1B is a network environment of the communication system with a repeater system in a second configuration, in accordance with another exemplary embodiment of the disclosure.

FIG. 1B is a network environment of the communication system with a repeater system in a second configuration, in accordance with another exemplary embodiment of the disclosure. FIG. 1B is explained in conjunction with elements from FIG. 1A. With reference to FIG. 1B, there is shown a communication system 100B that may include a repeater system 102 that include the network of RF repeater devices, such as the first RF repeater device 104 and the second RF repeater device 106 of FIG. 1A, re-configured in a different topology (e.g. different from the first topology of FIG. 1A).

In this configuration (i.e. the second configuration) of the network of RF repeater devices, the network and settings of the first RF repeater device 104 and the second RF repeater device 106 (i.e. repeaters #1 and #2) may be modified such that each RF repeater device connects directly to the source node 108 (i.e. node A). In this configuration, and in some embodiments, two beams (or streams) may be utilized by the source node 108 (i.e. node A) to service both the RF repeater devices (the first RF repeater device 104 and the second RF repeater device 106) concurrently. In one example, this re-configuration may be triggered by blockage of the communication link between the second RF repeater device 106 (repeater #2) and the first destination node 110 (node B). As a result of this blockage, the first destination node 110 (node B) may still be serviceable through the first RF repeater device 104 (repeater #1). In other words, the network of RF repeater devices may be re-configured from the first topology (as shown in FIG. 1A) to the second topology (or settings as shown, for example, in FIG. 1B). This re-configuration and transition between first and second configurations (i.e. from first topology to the second topology), may be executed in a dynamic or semi-static fashion.

Figure 1C:
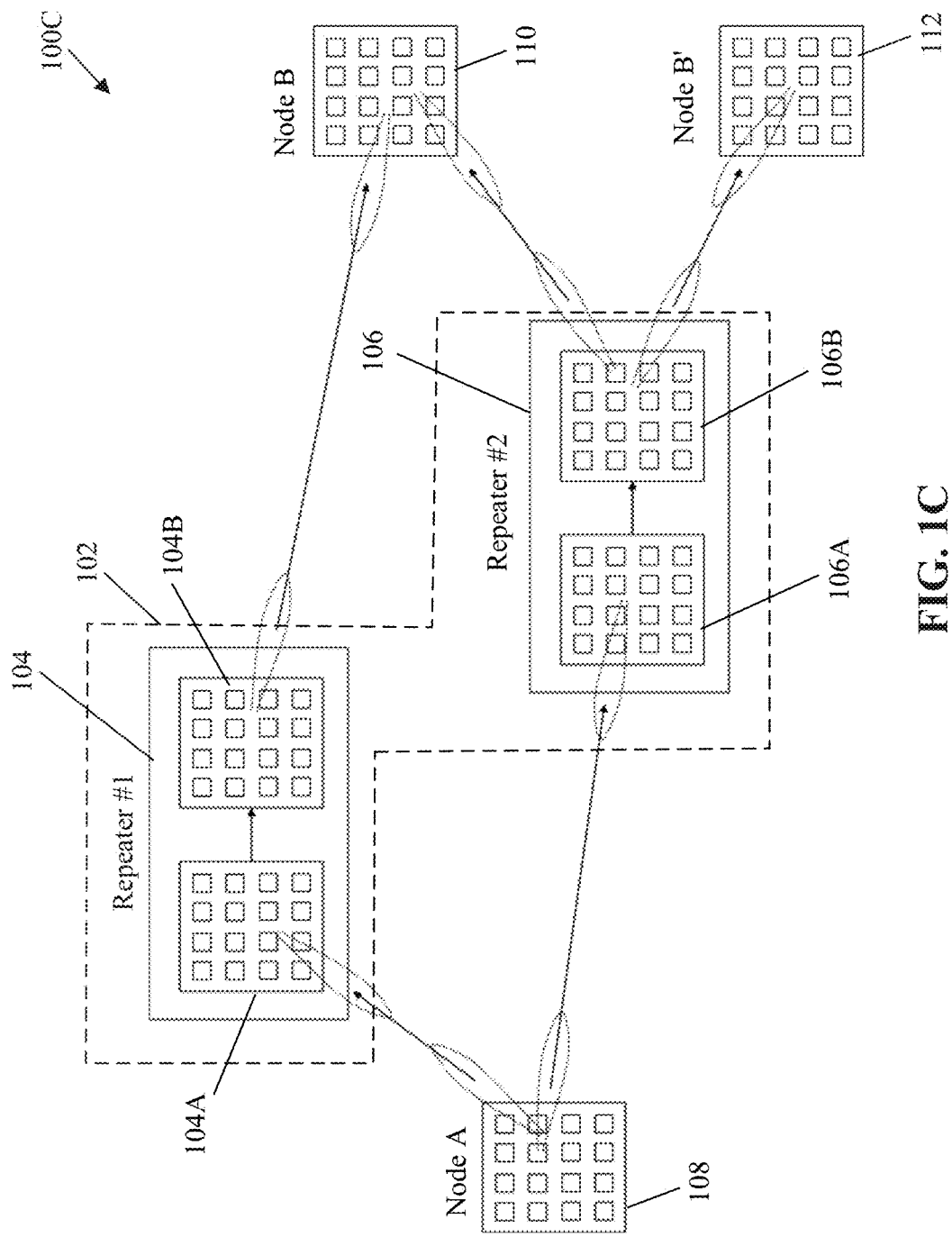
FIG. 1C is a network environment of the communication system with a repeater system in a third configuration, in accordance with an exemplary embodiment of the disclosure.

FIG. 1C is a network environment of the communication system with a repeater system in a third configuration, in accordance with an exemplary embodiment of the disclosure. FIG. 1C is explained in conjunction with elements from FIGS. 1A and 1B. With reference to FIG. 1C, there is shown a communication system 100C that may include the repeater system 102 that include the network of RF repeater devices, such as the first RF repeater device 104 and the second RF repeater device 106, re-configured in a different topology (e.g. different from the topology of FIG. 1A or 1B).

In this configuration (i.e. the third configuration), the topology of the RF repeater devices connectivity may be re-configured, to address higher traffic/throughout demand by the first destination node 110 (i.e. node B). In this example, the network of RF repeater devices may be re-arranged, such that the first destination node 110 (node B) may receive two streams, concurrently, each from a different repeater (e.g. the first RF repeater device 104 and the second RF repeater device 106 in this case), to allow stream aggregation over same frequency/time slot, through different spatial paths, as shown, in an example. It is to be understood by a person of ordinary skill in the art that other events or changes in network condition may trigger a dynamic re-configuration of the topology of the network of RF repeater devices in terms of utilization and allocation of RF repeater devices between the source node 108 and the one or more destination nodes (i.e. the first destination node 110 and the second destination node 112).

In accordance with an embodiment, the control of the one or more second RF repeater devices (e.g. the second repeater device 106) in the network of RF repeater devices is executed via an in-band communication between the first RF repeater device 104 and the one or more second RF repeater devices. Alternatively, the control of the one or more second RF repeater devices in the network of RF repeater devices may be executed via an out-of-band communication between the first RF repeater device 104 and the one or more RF second repeater devices. In other words, a control channel for reconfiguring the topology of the RF repeater devices may utilize a subset of following options: A) in-band channel: where the same data plane may be used for exchanging commands between a network management engine and the RF repeater devices of the network of RF repeater devices; B) out of band channel (out of 5G communication band): where another link, such as LTE or Wi-Fi link may be used for exchanging commands between the network management engine and the RF repeater devices of the network of RF repeater devices (e.g. the first RF repeater device 104 and the second RF repeater device 106).

Figure 2:
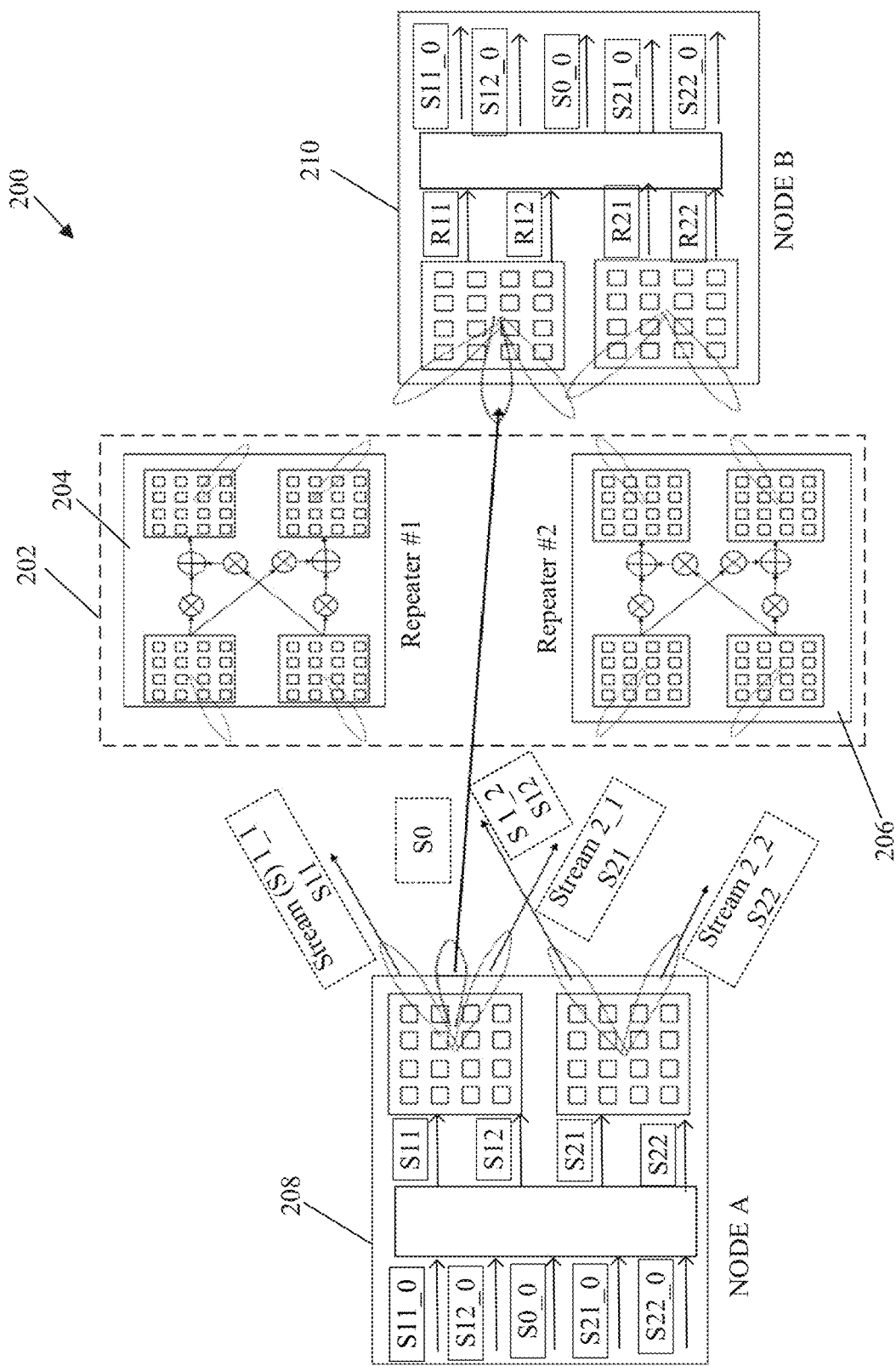
FIG. 2 is a network environment of a communication system with a repeater system, in accordance with yet another exemplary embodiment of the disclosure.

FIG. 2 is a network environment of a communication system with a repeater system, in accordance with yet another exemplary embodiment of the disclosure. FIG. 2 is explained in conjunction with elements from FIGS. 1A, 1B, and 1C. With reference to FIG. 2, there is shown a communication system 200 that may include a repeater system 202. In FIG. 2, the communication system 200 that includes the repeater system 202 represents joint utilization of a direct and repeater paths of the repeater system 202. There is further shown RF repeater devices 204 and 206 of the repeater system 202, a source node 208, (i.e. node A), and a destination node 210 (i.e. node B). The repeater system 202 corresponds to the repeater system 102.

In some embodiments, a plurality of nodes (e.g., the source node 208, (i.e. node A), the destination node 210 (i.e. node B), the RF repeater device 204 (i.e. repeater #1), and the RF repeater device 206 (i.e. repeater #2)) may deploy multiple physical antenna arrays to expand on their MIMO processing capabilities, as shown in FIG. 2. In this case, the physically separated (i.e. distinguished) antenna arrays may be deployed for transmitting multiple streams. For example, as shown in FIG. 2, each antenna array may be configured to transmit two or three data streams through two or three different beams, and a total five streams may be transmitted by the source node 208, (i.e. node A).

In this embodiment, a combination of routing paths through the RF repeater devices 204 and 206 and direct paths may be utilized to deliver multi-streams from the source node 208 (i.e. node A) to the destination node 210 (node B). In an example, at least one network node, such as one RF repeater device of the network of RF repeater devices (or a central communication device, such as a network management engine (not shown)), may be configured to communicate with other network nodes (including source node, RF repeater devices, or destination nodes) to determine the combination of routing paths. As shown in 2, the destination node (i.e. node B) may be configured to concurrently receive data streams through repeater nodes 204 and 206 (e.g., repeaters #1 and #2), while receiving same or different streams through different beams from the source node 208 (i.e. node A) directly. The direct path from the source node 208 (i.e. node A) to the destination node (i.e. node B) (carrying signal or stream S0), may be a line-of-sight path, or a reflective indirect path between the source node 208 and the destination node 210 (i.e. nodes A and B). In some embodiments, topology and relative coordinates of repeaters and the source node 208 and the destination node 210 (i.e. nodes A and B) may be utilized (by one of the RF repeater device or the central communication device or other network management engines) to provide improved separation/isolation between the signal streams propagating through the repeater nodes 204 and 206 (e.g., repeaters #1 and #2), and the signal streams propagating directly between the source node 208 and the destination node 210 (i.e. nodes A and B).

In accordance with an embodiment, one or more implementations may be jointly or separately supported by the communication system 200. For example, in a first implementation, all beams and streams (e.g. streams S11, S12, S0, S21, and S22 carried by different beams of RF signals) shown in the FIG. 2, may be transported over the same antenna radiation polarity (e.g. all transmitted over vertical polarization, or all transmitted over horizontal, or all transmitted over circular polarization). In a second implementation, a subset of beams (and streams) shown in the FIG. 2, may be transported over H polarization, while another subset may be transported over V polarization.

In an implementation, additional cross-coefficients (i.e. a plurality of signal parameters) may be implemented and utilized in following approaches. In a first approach (a), such plurality of signal parameters (e.g. complex value parameters of gain/phase) may use the expression: $a_{11}*\exp(j*phi_{11})$. Each RF repeater device (such as the RF repeater devices 204 and 206) may include different values for these signal parameters. In some embodiments, 8 total complex coefficients (4 or 5 coefficients per RF repeater device in the repeater system 202, in this example), may be derived and selected to: 1) optimize MIMO capacity of the MIMO channel from [S11 S12; S21 S22] to [R11 R12; R21 R22]. In this embodiment, these complex coefficients to maximize the sum of eigenvalues of the 4×4 MIMO channel matrix, and 2) Optimize effective SNR for some or all of streams S11_0, S12_0, S_0, S21_0, S22_0. In this case, the destination node 210 (i.e. target) may maximize link robustness and SNR margin.

In a second approach (b), relative gain adjustment between streams may be achieved based on the plurality of signal parameters (i.e. additional cross-coefficients or values) selected at each RF repeater device (such as RF repeater devices 204 and 206). The plurality of signal parameters (i.e. the coefficients) may be utilized as joint gain control across the source node 208, the destination node 210 (node A and node B) or RF repeater devices 204 and 206 and across all streams in order to provide a balance between relative power levels of streams R11, R12, R21, R22 at the destination node 210 (i.e. node B), and to ensure that no stream (including estimated stream S0) degrades other streams due to high power level and inherent cross-leakage.

In another implementation, various beams (carrying corresponding streams) deployed at the network nodes (the source node 208 and the destination node 210) and the RF repeater devices 204 and 206, may be operating all over a single carrier frequency. In yet another, implementation, various beams (carrying corresponding streams) deployed at the network nodes (the source node 208 and the destination node 210) and the RF repeater devices 204 and 206, may be operating selectively over different carrier frequencies. This embodiment may be utilized, for example, when a plurality of streams may be transported over different channels (or carriers) in a carrier-aggregation mode of operation.

In another implementation, the plurality of signal parameters (i.e. the complex coefficients or values) inside the RF repeater devices 204 and 206 (i.e. the repeaters #1 or #2) may deploy fixed values to implement an intermediary MIMO processing on the streams passing through a RF repeater device (e.g. the RF repeater device 204 or RF repeater device 206). For example, these signal parameters (i.e. complex value) may form a 2×2 matrix structure of [+1+1; +1−1] or other matrix structures that may effectively apply a unitary MIMO processing on the data streams.

Figure 3:
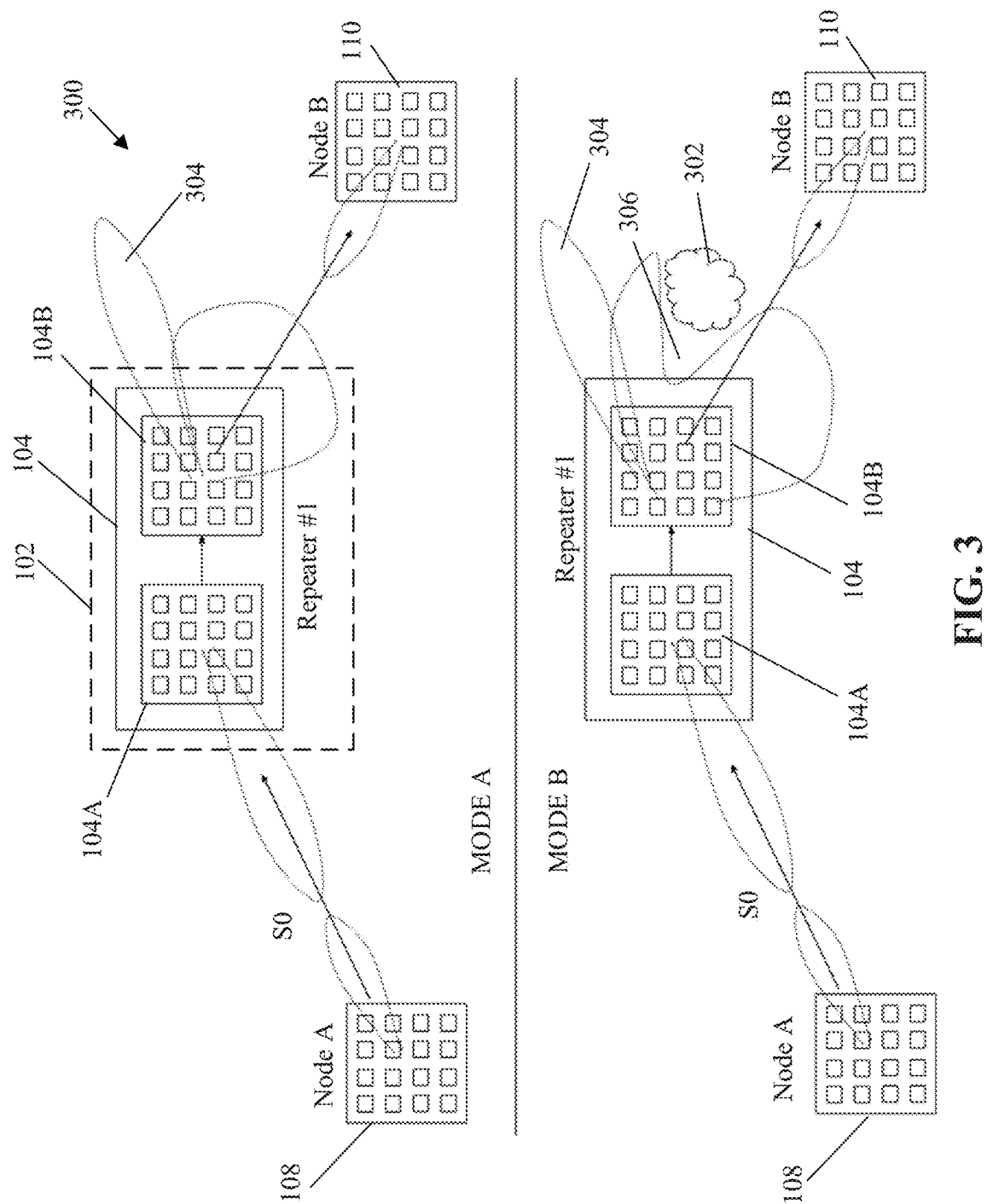
FIG. 3 is a network environment of a communication system with a repeater system, in accordance with yet another exemplary embodiment of the disclosure.

FIG. 3 is a network environment of a communication system with a repeater system, in accordance with yet another exemplary embodiment of the disclosure. FIG. 3 is explained in conjunction with elements from FIGS. 1A, 1B, 1C, and 2. With reference to FIG. 3, there is shown a communication system 300 that may include the first RF repeater device 104 of the repeater system 102. In FIG. 3, the communication system 300 represents blockage and reflection avoidance by the repeater system 102. There is further shown the source node 108 (i.e. node A) and the first destination node 110 (i.e. node B).

In some embodiments, a given a RF repeater device (e.g. the first RF repeater device 104) in the network of RF repeater devices is configured to utilize beam optimization techniques to avoid radiating power towards objects (e.g. a signal blocking object 302) in the vicinity of the given repeater device (e.g. the first repeater device 104). In some embodiments, the first repeater device 104 may be configured to utilize an auxiliary beam (i.e. a monitoring beam 304) to monitor surrounding environment by sensing for reflective power. This additional beam (i.e. the monitoring beam 304) provides information on directions that results in stronger reflective power, indicating that power radiating in such directions is reflected back towards the given RF repeater device (e.g. the first RF repeater device 104). For example, consider "mode A" of operation, where no signal blocking object (or reflective object) may be present. In this case, the given RF repeater device (e.g. the first RF repeater device 104) is configured to select a wide beam pattern to radiate power over the wide beam to provide coverage to most users in its vicinity. In "mode B" of operation, the first RF repeater device 104 is further configured to identify the signal blocking object 302 in its vicinity and at a certain direction (e.g., by utilizing the monitoring beam 304, or any other technique for proximity detection). Thereafter, the first RF repeater device 104 may be configured to re-configure its main beam to create a null (an avoidance region 306), to avoid radiating power in the direction of the signal blocking object 302 (e.g. a blocker or a reflector). This may be done for several purposes: A) to prevent the reflected power from entering the repeater system 102 (specifically, the first RF repeater device 104 in this case) and causing oscillation or degrading signal quality through self-interference, B) to reduce effective radiation power by avoiding unnecessary radiation of energy in directions that do not provide coverage to the one or more destination nodes, such as the first destination node 110, and C) to reduce total effective power consumption by reducing the power profile of one or more power amplifiers (of the first RF repeater device 104), or switching off certain elements, as the total radiated power is reduced due to the avoidance region 306 in the radiation pattern.

Figure 4:
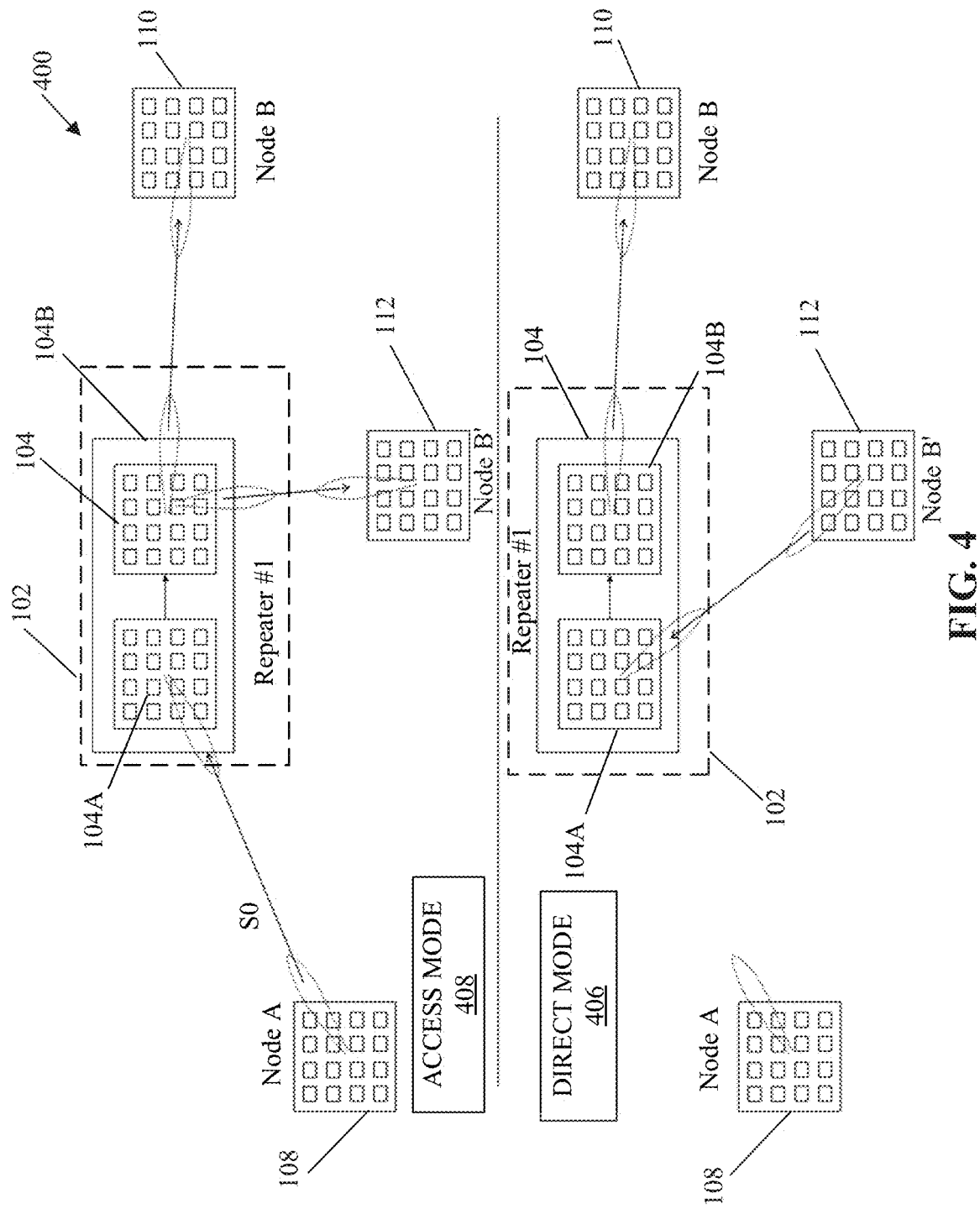
FIG. 4 is a network environment of a communication system with a repeater system, in accordance with another exemplary embodiment of the disclosure.

FIG. 4 is a network environment of a communication system with a repeater system, in accordance with another exemplary embodiment of the disclosure. FIG. 4 is explained in conjunction with elements from FIGS. 1A, 1B, 1C, 2, and 3. With reference to FIG. 4, there is shown a communication system 400 that may include the repeater system 102. In FIG. 4, the communication system 400 represents a direct mode 406 versus an access mode 408 of operations by the repeater system 102. There is further shown the source node 108 (i.e. node A), the first destination node 110 (i.e. node B), and the second destination node 112 (i.e. node B').

In some embodiments, the first RF repeater device 104 may be configured to facilitate a wireless connection between two end nodes (or, two destination nodes, such as the first destination node 110 and the second destination node 112, or two user equipment nodes). As shown, two mode of operation may be supported, for example, the direct mode 406 and the access mode 408. With no loss of generality, in an example, the source node 108 (Node A) may be a base station in a wireless network. Similarly, the first destination node 110 and the second destination node 112 (i.e. nodes B and B') may be two user equipment (for example, two end user consumer devices) attached to the base station node A (i.e. the source node 108). In the access mode 408, as shown, the first destination node 110 and the second destination node 112 (Node Band B') may receive their respective data from the source node 108 (node A) and through the first RF repeater device 104. The network of RF repeater devices (e.g. the first RF repeater device 104) may determine to switch to the direct mode 406 of operation between the nodes B and B' (i.e. the first destination node 110 and the second destination node 112). However, direct propagation path between the first destination node 110 and the second destination node 112 (nodes B and B') may not provide the link quality desired or needed. Thus, in such a case, the first RF repeater device 104 may be configured to allocate its phase array resources, for example, separate antenna arrays (the first antenna array 104A and the second antenna array 104B (and beamforming capabilities) to provide a link between nodes B and B' (i.e. the first destination node 110 and the second destination node 112). In some embodiments, the source node 108 (node A, which may operate as an access point or a base station), may allocate time slots for the nodes B and B' (i.e. the first destination node 110 and the second destination node 112) to utilize those time slots (time and frequency resources) to establish direct links between the nodes B and B'. In this case, the first RF repeater device 104 may be further configured to modify beamforming configurations of the first RF repeater device 104 to provide paths from the second destination node 112 (node B') directly through receiving and transmitting beams of the first RF repeater device 104 and to the end point, such as the first destination node 110 (Node B).

In some embodiments, the source node 108 (node A, which may act as an access point or the base station), may determine and program available time slots into three categories: uplink slots (U), downlink slots (D), and flexible slots (X). In some embodiments, the slots assigned as flexible slots (X) may be allocated to nodes B and B' (i.e. the first destination node 110 and the second destination node 112) for direct communications. The first RF repeater device 104 or the central communication device (having network management engines) may be configured to instruct other nodes (e.g. Node A, B, B', other RF repeater devices) in a wireless network for the slots assignment.

In some embodiments, the direct link framework (i.e. the direct mode 406) as explained and shown, for example, in the FIG. 4, may be utilized to enable the proximity services (ProSe) as defined in 3GPP NR specifications through the network of repeaters devices that can beneficially create a viable propagation path between the first destination node 110 and the second destination node 112 (nodes B and B'). In some embodiments, same messaging protocols defined under 3GPP NR's ProSe specification may be utilized for allocating and establishing direct link between the first destination node 110 and the second destination node 112 (i.e. nodes B and B'), however, the direct path may be established through the network of RF repeater devices.

Figure 5:
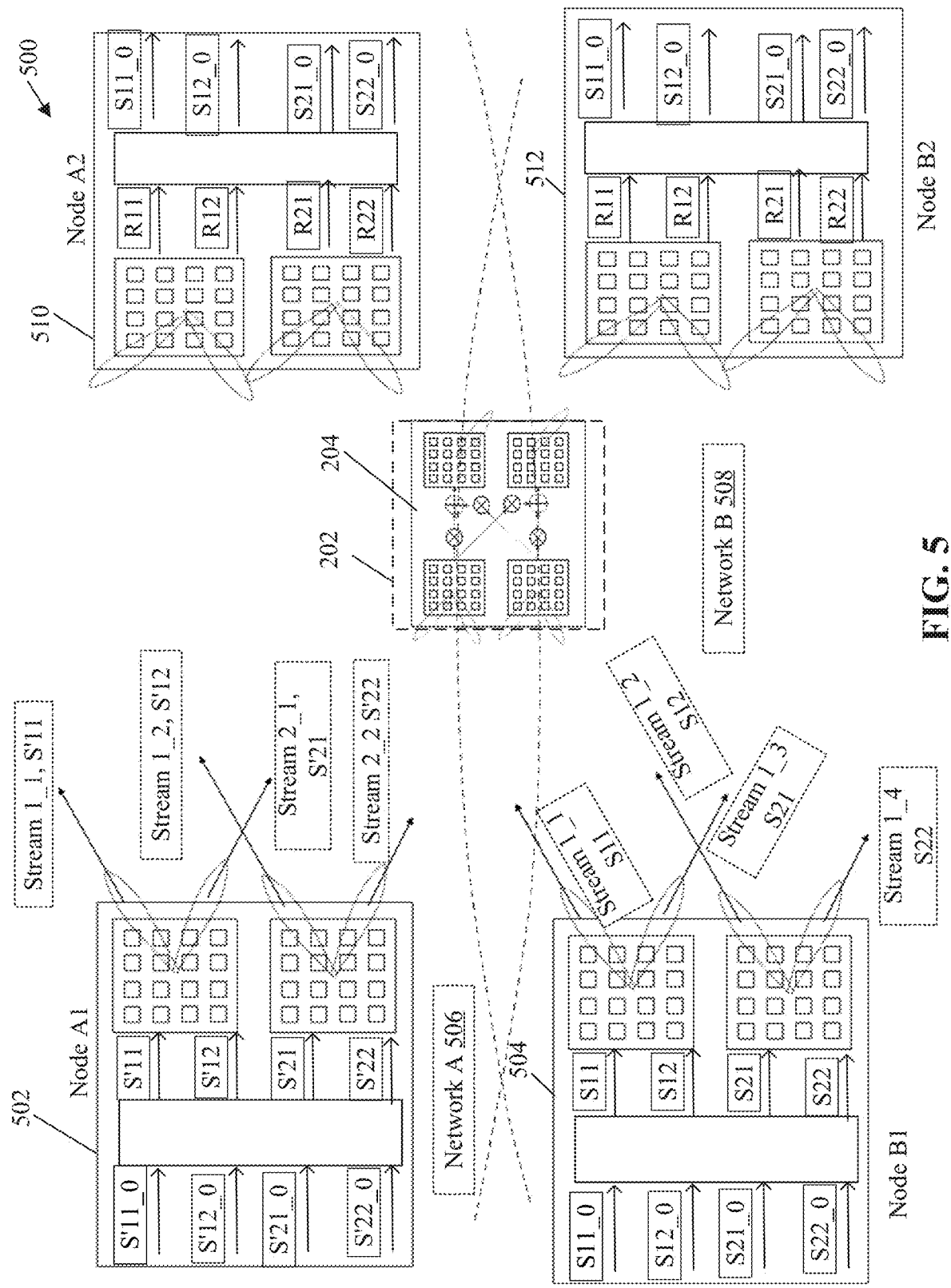
FIG. 5 is a network environment of a communication system with a repeater system, in accordance with yet another exemplary embodiment of the disclosure.

FIG. 5 is a network environment of a communication system with a repeater system, in accordance with yet another exemplary embodiment of the disclosure. FIG. 5 is explained in conjunction with elements from FIGS. 1A, 1B, 1C, 2, 3, and 4. With reference to FIG. 5, there is shown a communication system 500 that may include the repeater system 202. In FIG. 5, the communication system 500 represents a sharing of a given RF repeater device, such as the RF repeater device 204, by multiple source nodes, such as source nodes 502 and 504 (nodes A1 and B1). There is further shown a first destination node 510 (i.e. node A2) in a network A 506 and a second destination node 512 (i.e. node B2) in a network B 508.

In some embodiments, the first RF repeater device (e.g. the RF repeater device 204) may be further configured to establish a communicative coupling with a plurality of source nodes, such as the source nodes 502 and 504 (nodes A1 and B1). The first RF repeater device (e.g. the RF repeater device 204) may be further configured to share one or more phased array antenna and beamforming resources available within the first RF repeater device (e.g. the RF repeater device 204) concurrently with the plurality of source nodes, such as the source nodes 502 and 504 (nodes A1 and B1). The RF repeater device 204 may be utilized concurrently by multiple sources nodes. For example, multiple wireless base stations may use the same RF repeater device(s) in the network of RF repeater devices to connect to their respectively end-user devices, by utilizing the phased array and beamforming resources available within the RF repeater device(s).

In the FIG. 5, the source node 502 and the first destination node 510 (i.e. the nodes A1 and A2) form a network or a cell (e.g. the network A 506), whereas the source node 504 and the first destination node 511 (i.e. the nodes B1 and B2) form another adjacent or overlapping network (e.g. the network B 508). Both the network A 506 and the network B 508 may utilize the same repeater node, such as the RF repeater device 204, to facilitate or improve communication links within each network or cell. Some scenarios and embodiments are described below:

A) Geographically, the network A 506 and the network B 508 may be fully overlapping, partially overlapping, or adjacent cells.

B) The network A 506 and the network B 508 may operate on the same frequency channel or frequency band, or on different frequency channels.

C) The network A 506 and the network B 508 may be operated or managed by same operator/administrator or by different operators or telecommunications service provider.

D) The sharing of the first RF repeater device (e.g. the RF repeater device 204) between the network A 506 and the network B 508, may be executed on a dynamic basis. For example, depending on networks' configurations, traffic demand, and changes in the network conditions or environment, the first RF repeater device (e.g. the RF repeater device 204) may be configured to be assigned exclusively to the network A 506, assigned fully and exclusively to the network B 508, or be shared between the two networks (i.e. between the network A 506 and the network B 508). The transition between the above three modes of assignment may be dynamic or semi-static, and may be managed by the central communication device (e.g. a central network management engine) or at least one network device of the network of RF repeater devices.

E) Various sharing mechanisms may be utilized. For example, the RF repeater device 204 may have a plurality of antenna arrays for receiving and forwarding data streams. In some embodiments, a subset of antenna arrays may be exclusively allocated to the network A 506, while another subset of antenna arrays may be allocated to the network B 508. In another example, the RF repeater device 204 may have multi-beam capable phased arrays. In some embodiments, a subset of beams within same antenna array may be allocated to the network A 506, while another subset of beams within same antenna array are allocated to the network B 508.

F) In some embodiments, the network A 506 and the network B 508 may have same or similar uplink/downlink timing and slot allocations. In other embodiments, the two networks (network A 506 and the network B 508) may have arbitrary or uncoordinated network timing and duplexing configurations.

Figure 6:
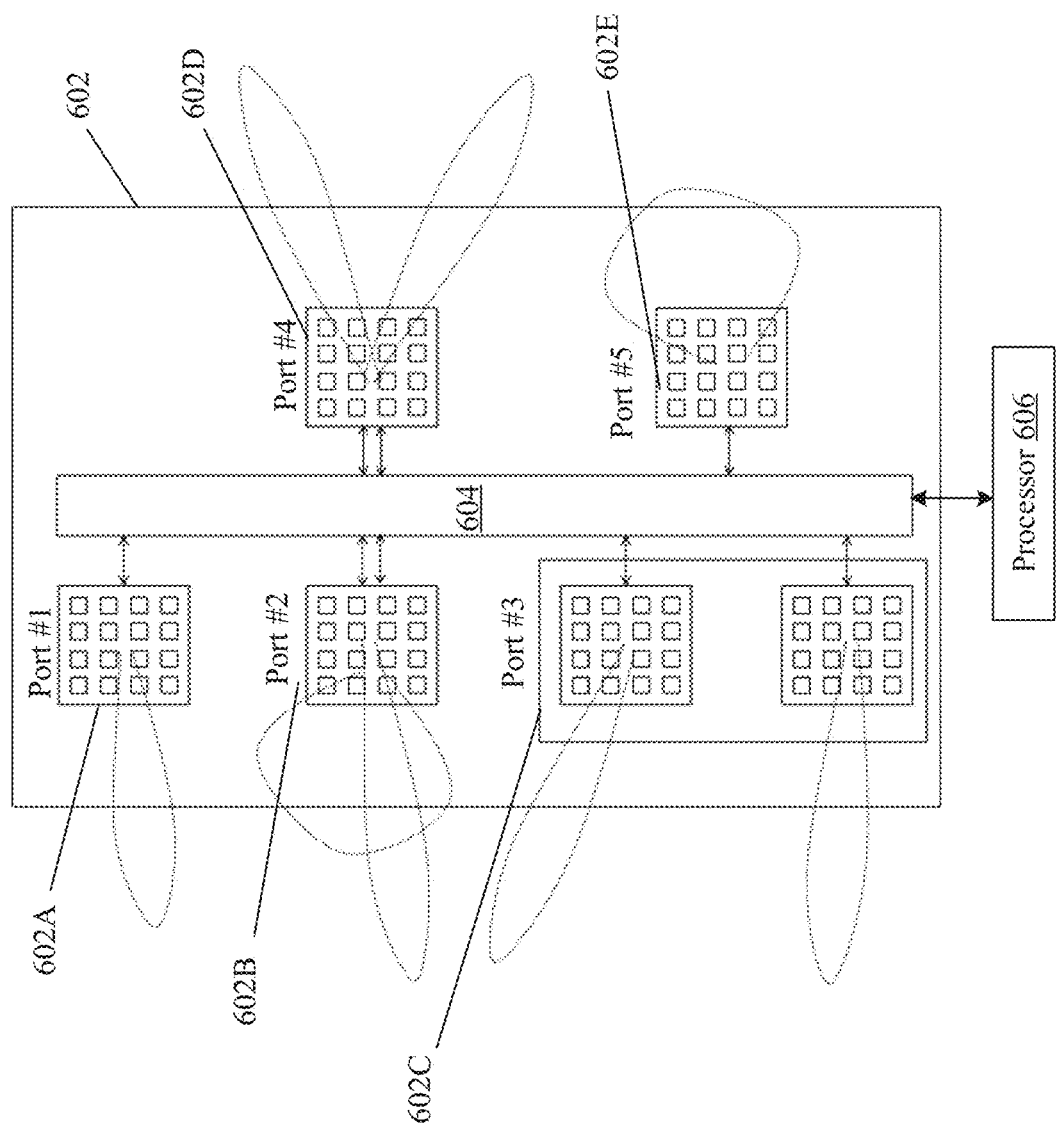
FIG. 6 is an illustration of a RF repeater device of a repeater system, in accordance with another exemplary embodiment of the disclosure.

FIG. 6 is an illustration of a RF repeater device of a repeater system, in accordance with another exemplary embodiment of the disclosure. FIG. 6 is explained in conjunction with elements from FIGS. 1A, 1B, 1C, and 2 to 5. With reference to FIG. 6, there is shown a RF repeater device 602 implemented to operate as a multi-port configurable radio frequency (RF)-switching RF repeater device. The RF repeater device 602 corresponds to the first RF repeater device 104, and may be a part of the repeater system 102 (that is one of the network of RF repeater devices).

In some embodiments, the RF repeater device 602 refers to a multi-port configurable switching device, which routes waveforms arriving through a subset of its antenna array panels to another subset of its antenna array panels. The RF repeater device 602 may comprise a plurality of ports 602A to 602E, where each port may comprise a plurality of antenna array resources. Each port may have a transmit, a receive, or a transmit/receive capability. These ports may be connected to each other through a configurable routing fabric 604. The RF repeater device 602 further includes a processor 606, which may execute one or more modes of operation and may have one or more routing mechanisms (described, for example, in various embodiments below).

In accordance with an embodiment, each port may have a single antenna array or encompass multiple antenna arrays. For example, the ports 602A, 602B, 602D, 602E (i.e. port #1, #2, #4,#5) each comprise one antenna array, whereas the port 602C (port #3) may comprise multiple antenna arrays (two or more antenna arrays).

In accordance with an embodiment, some ports may support single beam/stream operation (e.g., ports #1, #5), whereas some ports may support multi beam/stream operation through single array (e.g., ports #2 and #4), or through multiple arrays (e.g., port #3).

In accordance with an embodiment, the processor 606 may be configured to execute the routing (transportation of streams) between the ports 602A to 602E in RF domain (no frequency shifting), or in some intermediate frequency (IF) domain (down-converted to some IF frequency for connection between the incoming/outgoing ports within the RF repeater device 602), or in analog in-phase/quadrature-phase IQ domain, or in digital domain data streams.

In accordance with an embodiment, some ports may be configured for narrow-beam operation, whereas as some ports may be configured to create wide radiation patterns. Moreover, in another case, same ports may be dynamically configured between wide and narrow beams.

In accordance with an embodiment, a port within the RF repeater device 602 may be implemented for time-division-duplexing (TDD) or for frequency-division-duplexing (FDD) operation. A subset of ports from the ports 602A to 602E may be designed or configured to operate in the TDD mode, while other ports are configured to operate in the FDD mode. In some embodiments, a port may be implemented to operate in TX-only or RX-only mode of operation.

In accordance with an embodiment, all ports may be operable in the same frequency channel or band, e.g., as a switch within a single-frequency-network (SFN). In some other embodiments a subset of ports may be operable in one RF frequency, while others may be operable in another RF frequency.

In accordance with an embodiment, the ports 602A to 602E may be physically implemented or positioned within the RF repeater device 602 to cover different sectors. For example, a given RF repeater device may be implemented with four ports, each port covering a 90-degree sector. In this case, the given RF repeater device would have a full 360-degree field of view through four sectors. In some other variations, the given RF repeater device may include more ports, where each port may have a narrower field of view.

In accordance with an embodiment, the ports 602A to 602E may overlap in terms of their geographical coverage. For example, a sector covering a 90-degree field of view may include multiple ports covering that sector. These ports may be operating in the same frequency channel or different frequency channels.

In accordance with an embodiment, the processor 606 of the RF repeater device 602 may be configured to service or route streams from (within) different cells or networks (e.g. the network A 506 and the network B 508 of FIG. 5). For example, some ports may be allocated to the network A 506, while other ports are allocated to network B 508. The network A 506 and the network B 508 may be managed by different operators/administrators or same operator. The network A 506 and the network B 508 may use same frequency channel/band, or different bands.

In accordance with an embodiment, a static switching configuration may be executed by the processor 606 of the RF repeater device 602. The cross-connectivity between the ports 602A to 602E may be configured in a static or semi-static manner. For example, the cross-connectivity fabric 604 may be configured to connect and route or switch ports #1 to port #2 and vice-versa, port #3 to port #4 and vice-versa, etc. In the case of TDD mode of operation, same cross-connectivity path (e.g. the cross-connectivity fabric 604) may be utilized for support stream routing in both directions (e.g., both uplink and downlink directions).

In accordance with an embodiment, the processor 606 of the RF repeater device 602 may be configured to execute dynamic switching configuration. In the dynamic switching configuration, the cross-connectivity configuration may change dynamically, on one of following time scales: 1) per packet, 2) per time slot, 3) per frame, 4) per super-frame, 5) per OFDM, or OFDMA symbol.

In accordance with an embodiment, a control plane (or channel) may be used for dynamic switching by the processor 606. In this case, the information for switching the routing between the ports may be transported in one of following methods: 1) out-of-band channel, such as an LTE or a Wi-Fi link, 2) in-band channel, by embedding the routing configuration in the same frames transported across the ports, 3) embedded in PHY and/or MAC headers of frames being transported through the ports, or 4) in preamble portion of frames being transported through the ports. In the case of "preamble-based" messaging, the latency may be further minimized as the switching repeater (i.e. the RF repeater device 602) may be configured to detect the preamble at the beginning of a frame and apply the decoded switching or routing configuration to the current frame or subframe.

In accordance with an embodiment, the RF repeater device 602 may include switching table containing switching paths and beamforming settings. The processor 606 of the RF repeater device 602 may be configured to operate as a switching or routing device, where the incoming signals are routed or switched from an incoming port to an outgoing port without demodulating the stream. The streams may be routed in RF domain, some intermediate frequency (IF) domain, or down-converted analog signals. The RF repeater device 602 may be configured to route a plurality of streams through different sets of ports concurrently. These streams may arrive and depart on the same RF channel or different RF channels. The mapping look-up-table for routing incoming and outgoing ports may be abstracted to have local port numbers. In an example, the routing port mapping look-up-table may include following information elements, as given in Table 1.

TABLE 1

A routing port mapping look-up-table (LUT)

Port #1 to Port #5 (beam #1)
Port #2 (beam #1) to Port #5 (beam #2)
. . .

In accordance with an embodiment, the routing port mapping look-up-table also include information about port mapping as a function of slot number (or frame number). For example, this mapping may include mapping/routing information elements in following format (e.g. TABLE 2).

TABLE 2

A routing port mapping look-up-table
(LUT) with time slot information

Port #1 to Port #5 (beam #1) @ time slot #1
Port #1 to Port #2 (beam #1) @ time slot #2
Port #1 to Port #5 (beam #1) @ time slot #3
Port #2 (beam #1) to Port #5 (beam #2) @ time slot #1
. . .

The routing port mapping LUTs in table 1 or 2, may be updated by the processor 606 in one of following methods: 1) static or semi-static, 2) dynamic as the traffic or profile of nodes change, 3) the LUT updating may be applied over in-band channel (same data streams carry control information for routing table) or out-of-band channels (such as LTE or Wi-Fi, or any low-throughput robust link).

In some embodiments, the above mapping LUTs may include beamforming configuration information. For example, the above LUTs may take following format and information elements, as given, for example, in table 3.

TABLE 3

A routing port mapping look-up-table (LUT)
with beamforming configuration information Port #1 to Port #5 (beam #1) @ time slot #1,
with RX beam index #10 and TX beam index #15
Port #1 to Port #2 (beam #1) @ time slot #2,
with RX beam index #5 and TX beam index #12
Port #1 to Port #5 (beam #1) @ time slot #3,
with RX beam index #1 and TX beam index #2
Port #2 (beam #1) to Port #5 (beam #2) @
time slot #1 . . .
. . .

With the above extended LUT architecture, the RF repeater device 602 have the necessary information to route incoming streams from each to port to corresponding outgoing port, and it would know the time slot for this routing, and also the beam configurations needed to be applied to the receiving and transmitting phased arrays.

In some embodiments, preamble-based routing information may be embedded at beginning of packets/frames in the form of a detectable (match-able) sequence. For example, consider a RF repeater device with total 8 ports/streams. For a per-packet dynamic routing of packets across the ports, a preamble may be added to beginning of each packet. By matching this added preamble sequence at the beginning of a frame/packet against a known set of sequences, the RF repeater device in the network of RF repeater devices, may be configured to determine to which port the incoming stream should be routed to. For example, if the additional preamble sequence is matched against sequence #5, then the RF repeater device may determine to route this packet/frame to port #2 (one to one deterministic mapping). This allows for per-packet dynamic routing of streams without decoding of PHY or MAC headers, hence eliminating any latency associate with decoding and/or demodulating.

In accordance with an embodiment, the processor 606 of the RF repeater device 602 may be configured to remove the routing preamble sequence at a beginning of a stream and substitute that with a different preamble sequence at the beginning of outgoing packet (or frame). The substitution may be done all in RF and/or analog domain, without adding any latency to the data stream. The substituted new preamble sequence is to enable the subsequent repeater node to identify the routing path when a next RF repeater device receives the outgoing packet/frame. In some embodiments, the "routing port mapping look-up-table (LUT)" may be extended to include the information for the preamble sequence being inserted to outgoing packets/frames. For example, the following information may be captured in this LUT, in table 4, in an example.

TABLE 4

A routing port mapping look-up-table (LUT)
with preamble sequence information

Incoming preamble sequence at Port #1 or port #3 is to
route incoming stream to Port #5 (beam #1) @ time
slot #1 AND substitute preamble sequence at beginning
of received packet/frame with preamble sequence #1
. . .

In some embodiments, the processor 606 of the RF repeater device 602 may be configured to utilize a standardized Application Program Interface (API) to enable exchanges between the RF repeater device 602 and other nodes or entities within the broader communication network. These APIs may be utilized for control plane or for monitoring or probing purposes. These APIs may be implemented as in-band channel where the primary communication link is utilized for transporting API commands. In some embodiments, such APIs may be accessible through an out-of-band channel. For example, the primary communication protocol may be a mmWave 5G NR system for transmitting/receiving streams through various ports, whereas these API command exchanges may be transported over an LTE or Wi-Fi channel. In some embodiments, such APIs may be used by a programming or network optimization engine residing in a remote server or a cloud server, such as the central communication device, for accessing, monitoring, and configuring a large number of RF repeater devices, such as the network of RF repeater devices.

In some embodiments, the standardized APIs may be used for configuring the various look-up tables residing within the RF repeater device 602 for beam programming and selection, ports mapping, and time slot allocation. For examples, all mapping or selection information elements listed in previous embodiments may be accessible or programmable through such APIs by the processor 606. These APIs may be used with standardized function definitions, function calls, and function arguments to program each/all information elements. In some embodiments, such APIs may be used for dynamic and/or real-time programming of the various elements in the lookup tables (LUTs). In some embodiments, such APIs may have time stamps (e.g., time slot numbers) for each control command to take impact.

In some embodiments, the processor 606 of the RF repeater device 602 may be configured to implement APIs to collect link statistics, repeater status/logs, for a subset of ports, or beams/streams. For example, such standardized APIs would support probing and reading of metrics such as: RSSI per port/beam, SNR per port/beam as a function of slot number, cross-leakage between streams, beams, and/or polarizations.

Figure 7:
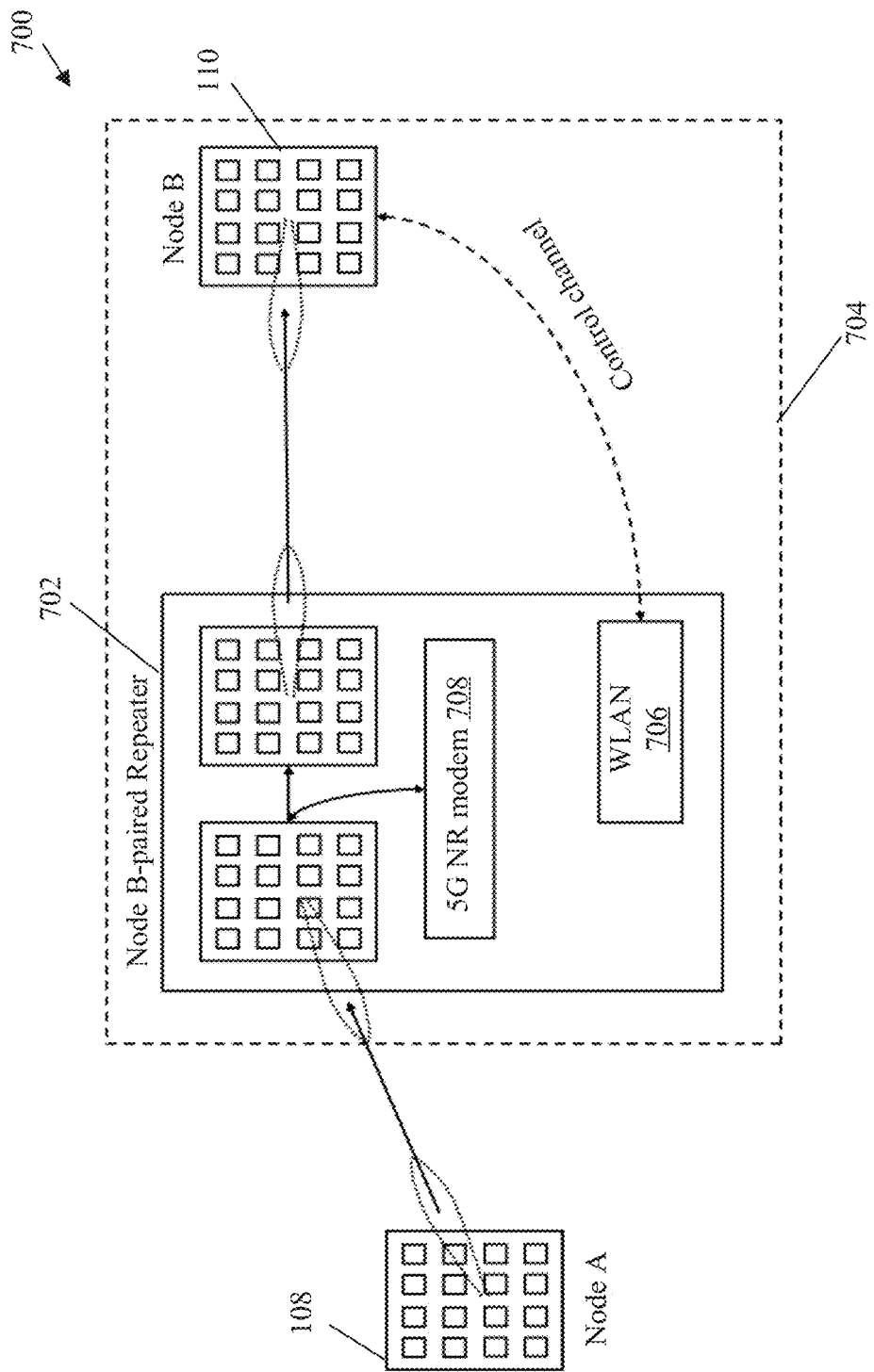
FIG. 7 is a network environment of a communication system with a repeater system, in accordance with yet another exemplary embodiment of the disclosure.

FIG. 7 is a network environment of a communication system with a repeater system, in accordance with yet another exemplary embodiment of the disclosure. FIG. 7 is explained in conjunction with elements from FIGS. 1A, 1B, 1C, and 2 to 6. With reference to FIG. 7, there is shown a communication system 700 that may include a repeater system that include a first RF repeater device 702. In FIG. 7, the communication system 700 represents the first RF repeater device 702 as a UE-paired RF repeater device (i.e. paired with the first destination node 110). There is further shown the source node 108 and an extended boundary 704 (represented by a dashed rectangular box) of the first destination node 110 (Node B).

In accordance with an embodiment, a repeater, such as the first RF repeater device 702, may be closely or exclusively associated with a destination node, such as the first destination node 110, in the communication system 700. For example, assume the source node 108 (node A) being a wireless base station and the first destination node 110 (Node B) being a user equipment (UE) such as a smartphone or a customer premise equipment (CPE) device. In this configuration, the first destination node 110 (i.e. the UE node) utilizes the first RF repeater device 702 for improved connectivity performance. For example, the first destination node 110 (i.e. the UE node) may utilize the RF repeater device 702 for: 1) higher throughput, 2) better coverage, 3) lower power consumption by the first destination node 110 (i.e. the UE node) through leveraging the transmit/receive resources of the RF repeater device 702.

In accordance with an embodiment, a control channel may be used between the first destination node 110 (node B) and the RF repeater device 702, where this control channel may be different than the primary link or communication protocol between the source node 108 (Node A) and the first destination node 110 (Node B). For example, a wireless local area network (WLAN) 706 (e.g. a Wi-Fi or a Bluetooth link) may be used for exchanging control and configuration commands between the first destination node 110 (Node B) and the first RF repeater device 702.

In accordance with an embodiment, the first RF repeater device 702 may be configured to control and facilitate a beam training between the first destination node 110 (Node B) and the first RF repeater device 702. The beam training may be controlled or facilitated by the WLAN 706 (i.e. the Wi-Fi/BT link), as a control channel. In some embodiments, the first RF repeater device 702 may be managed and configured by the first destination node 110 (Node B), for low power consumption and operation. For example, the first destination node 110 (Node B) may utilize its information about traffic demand/pattern and the allocation of time slots to the first destination node 110 (Node B) by the source node 108 (Node A), to identify the time slots that the first RF repeater device 702 needs to be activated and/or the link direction for the first RF repeater device 702 (e.g. where its transporting data uplink or downlink). In some embodiments, the first destination node 110 (Node B) may be configured to use the Wi-Fi/BT link for sending low power mode of operation commands to the first RF repeater device 702. For example, for time slots that the first destination node 110 (Node B) may be expected to be in sleep mode or standby mode, the first destination node 110 (Node B) may then instruct the first RF repeater device 702 over the Wi-Fi/BT link to switch off its components (phased array receivers/transmitters) related to primary link to preserve power consumption). In some embodiments, the power mode states of the first destination node 110 (Node B) (from link perspective), such as TX mode, RX mode, Standby, Sleep, Deep-Sleep are replicated at the first RF repeater device 702 (synced over Wi-Fi/BT link), so that the first RF repeater device 702 may save power consumption by implementing same/similar power modes.

In accordance with an embodiment, the first destination node 110 (Node B) may be configured to utilize the first RF repeater device 702 to implement its transmit power control commands. For example, for uplink slots, and where the first destination node 110 (Node B) is required to adjust (increase/decrease) its transmit power level, it may utilize the first RF repeater device 702 and the control channel access (WLAN 706) to the first RF repeater device 702, to instead adjust the power level of a second antenna array facing the first destination node 110 (Node B), when the source node 108 (Node A) may be transmitting data towards the first destination node 110 (Node B).

In accordance with an embodiment, the source node 108 (Node A) may be configured to utilize its processing resources and measurements done on the incoming signal, to facilitate or improve the automatic gain control implemented inside the first RF repeater device 702 to adjust various gain levels through the repeater signal chain. This may be done when first RF repeater device 702 is in receiver mode or in transmit mode.

In accordance with an embodiment, a 5G NR digital modem 708 (or a subset of modem function) may be added into the repeater design, such as the first RF repeater device 702. The 5G NR digital modem 708 (when it functions as a demodulator) may not be included in the path of incoming/outgoing stream. In this case, the first RF repeater device 702 may not add any latency to the data stream being transported from the source node 108 (Node A) towards the first destination node 110 (node B). In some embodiments, electronic subscriber identity module (eSIM) may be used so that the same wireless line authentication (or number) used by the first destination node 110 (e.g., a smartphone with 5G NR mmWave modem) is replicated and used by the 5G NR digital modem 708 inside the first RF repeater device 702. This allows the 5G NR modem 708 inside the first RF repeater device 702 to decode the same user channels as the first destination node 110 (Node B). Such mode of operation may be utilized to fully synchronize the operation modes and power modes of the first destination node 110 (Node B) and the first RF repeater device 702 with very accurate timing synchronization. This mode of operation eliminates the need for using the Wi-Fi/BT link for configurating the power modes of first RF repeater device 702 by the first destination node 110 (Node B), and hence eliminates the latency introduced otherwise by such control commands.

In accordance with an embodiment, a subset of following power modes (as defined in 5G NR specifications per 3GPP) are supported by the combination of the first destination node 110 (Node B) and the first RF repeater device 702 (represented by the extended boundary 704): A) different bandwidth parts; B) de-activation of secondary cell; C)

switching to micro sleep mode by cross slot scheduling, or single-slot scheduling, or multi-slot scheduling; D) adaptation to number of streams/antenna arrays; E) adaptation to discontinuous reception and transmissions (DRx, DTx); F) adaptation to multi-DRx configuration; and lastly, adaptation to achieve reducing Physical Downlink Control Channel (PDCCH) monitoring or decoding. These power modes of operation are supported in 5G NR specification to enable User Equipment (UE) device, such as the first destination node 110, to minimize its power consumption by identifying above modes or configuration and implementing such modes of operation to adapt to these modes by switching off blocks or functions when possible.

In accordance with an embodiment, two modes of operation, or implementations may be used to minimize its power consumption. In a first mode of operation, the first destination node 110 (Node B as end UE) may be configured to extract the information needed to implement the above power modes of operation as part of decoding the streams it receives from the source node 108 (Node A). Thereafter, the first destination node 110 (Node B) may be configured to share such information (along with timing stamp/slot information) with the first RF repeater device 702 over Wi-Fi/BT link or any other short range communication link (e.g. the WLAN 706). Based on such information, the first RF repeater device 702 may be configured to implement and apply corresponding power saving modes (e.g., switching off its phased arrays and transceivers over time slots when the first destination node 110 (Node B) is not expecting any data).

In a second mode of operation, the first RF repeater device 702 may have 5G NR demodulation capability (reduced functionality compared to full demodulation capability of 5G NR modem inside Node B). This reduced functionality may be defined to be sufficient to extract the information needed for power modes listed in previous embodiments. In some embodiments, shared SIM/authentication may be utilized so that first RF repeater device 702 may demodulate and extract information that may have been exclusively targeted for the first destination node 110 (Node B), or encrypted for the first destination node 110. In this mode of operation, the WiFi/BT link may not be utilized for communicating dynamic power modes, and thus eliminating the latency associated with decoding power mode information by the first destination node 110 (Node B) and transporting them over WiFi/BT link. This allows the first RF repeater device 702 to decode power modes impacting the current or next immediate time slots, and allow the first RF repeater device 702 to change its power mode in a very dynamic/fast manner for higher power saving.

In accordance with an embodiment, a combination (hybrid) mode of operation may be utilized taking advantage of the above two modes of operation. For example, entering/exiting deep-sleep mode of operation may be controlled by the first destination node 110 (Node B) and instructions may be transported over the WiFi/BT link. The first RF repeater device 702 may be further configured to detect dynamically changing power modes (such as DRX, DTX, multi-slot configuration) internally within the first RF repeater device 702 using its embedded demodulator, such as the 5G NR modem 708 (where this demodulator may be full functionality or reduced functionality), so that the first RF repeater device 702 can adapt to these dynamic power modes instantly, without penalizing by the latency going through the first destination node 110 and receiving back over the Wi-Fi/BT link.

The various embodiments, described, for example, in FIG. 7, may be extended to support the case where the first RF repeater device 702 is associated with a set of user equipment (UEs) belonging to same family, such as a conference room), and the above features may be utilized to control the first RF repeater device 702 for low power consumption. In some embodiments, one of UEs may act as a master UE/node to control the macro power saving modes of another RF repeater devices.

Figure 8:
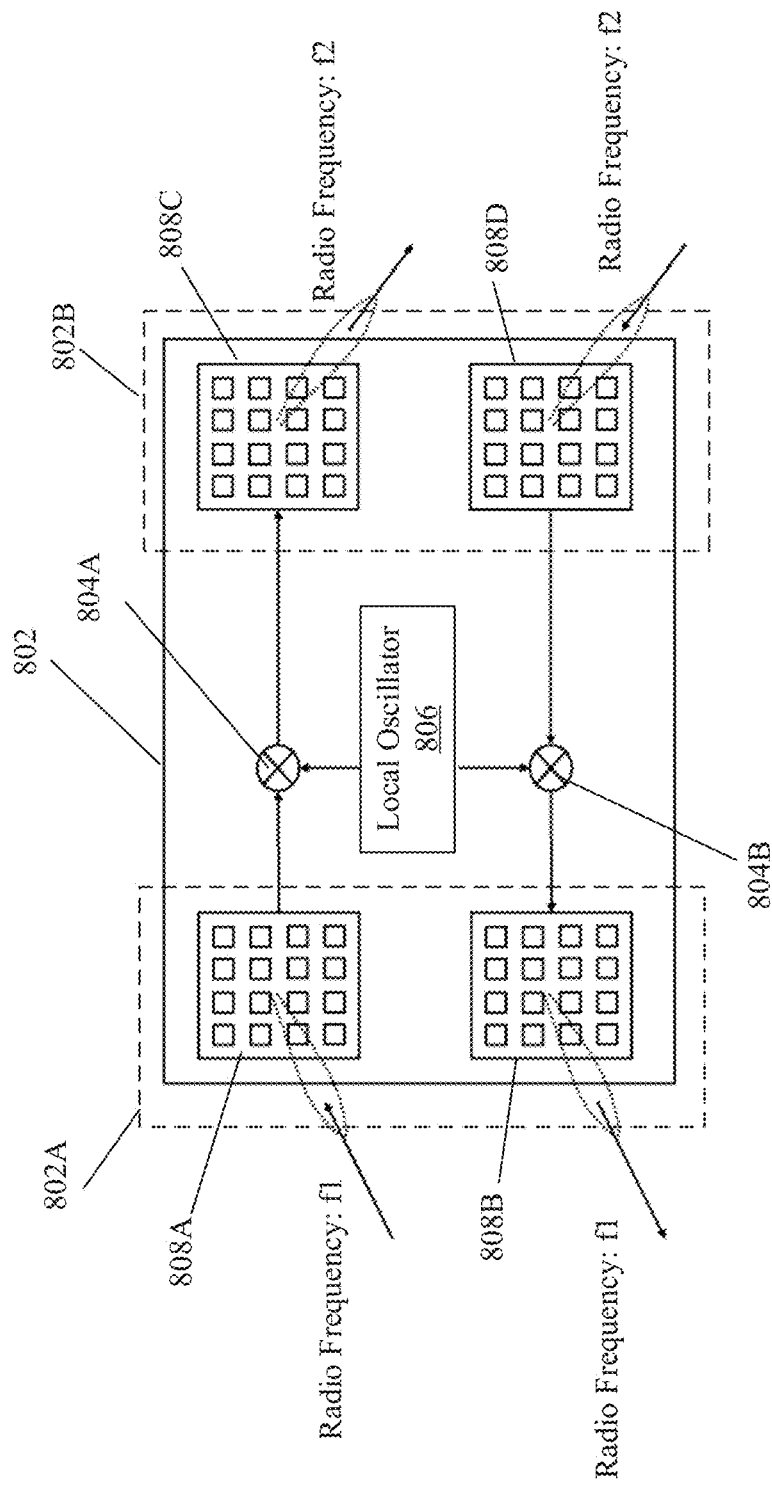
FIG. 8 is an illustration of a RF repeater device of a repeater system, in accordance with another exemplary embodiment of the disclosure.

FIG. 8 is an illustration of a RF repeater device of a repeater system, in accordance with another exemplary embodiment of the disclosure. FIG. 8 is explained in conjunction with elements from FIGS. 1A to 1C and 2 to 7. With reference to FIG. 8, there is shown a RF repeater device 802 implemented as a frequency-converting repeater that operate in a multi-frequency network of repeaters. The RF repeater device 802 corresponds to the first RF repeater device 104, and may be a part of the repeater system 102 (that is one of the network of RF repeater devices).

In accordance with an embodiment, the RF repeater device 802 has a first side 802A facing substantially towards the source node 108 and a second side 802B that is opposite the first side 802A and faces substantially towards the one or more destination nodes, such as the first destination node 110 and the second destination node 112. The RF repeater device 802 comprises one or more first antenna arrays (e.g. antenna arrays 808A and 808B) and one or more second antenna arrays (e.g. antenna arrays 808C and 808D). The RF repeater device 802 is further configured to receive and transmit waveforms on each of the first side 802A and the second side 802B via different antennas arrays of the RF repeater device 802.

Multi-Frequency Network of Repeaters: In accordance with an embodiment, the RF repeater device 802 is further configured to operate at different carrier frequency for incoming and outgoing waveforms. The incoming and outgoing waveforms may be understood from the FIG. 8, by the direction of arrows as shown with respect to the RF repeater device 802. In other words, the RF repeater device 802 may use a different RF carrier frequency for incoming/outgoing waveforms. For example, as shown, the incoming/outgoing waveforms on the first side 802A of the RF repeater device are centered at carrier frequency f1, whereas the incoming/outgoing waveforms on the second side 802B of the RF repeater device 802 are centered at carrier frequency f2. In a case where the carrier RF frequency of incoming and outgoing signals are different, such configuration may be utilized, for 1) better utilization of spectral channels, 2) better overall frequency planning of network, and 3) better isolation between the two antenna arrays inside a given RF repeater device operating at same time or channel.

Following are some embodiments and examples of the operations of the RF repeater device 802. In a first example, the RF repeater device 802 may have a configuration where different physical antennas are utilized on each side of RF repeater device 802 for receiving and transmitting waveforms. As this configuration may be used in frequency division duplexing (FDD) systems, same implementation may be used for time division duplexing (TDD) systems. In a second example, and in case of TDD systems, a same physical antenna may be used on each side for both transmit and receive operations, as the transmit and receive time slots are non-overlapping. In a third example, both f1 and f2 may both belong to millimeter wave (mmWave) bands. For example, f1 and f2 belong to 39 GHz band and 60 GHz band, respectively. In a fourth example, one of f1 or f2 may belong to a mmWave band (e.g., 60 GHz), whereas the other frequency belongs to a lower frequency band (e.g., 3.6 GHz in CBRS band). The up and down converters 804A and 804B along with the local oscillator 806 in the RF repeater device 802 are used for the up-conversion and down-conversion of an incoming signal in one frequency to another frequency of an outgoing waveform.

Figure 9:
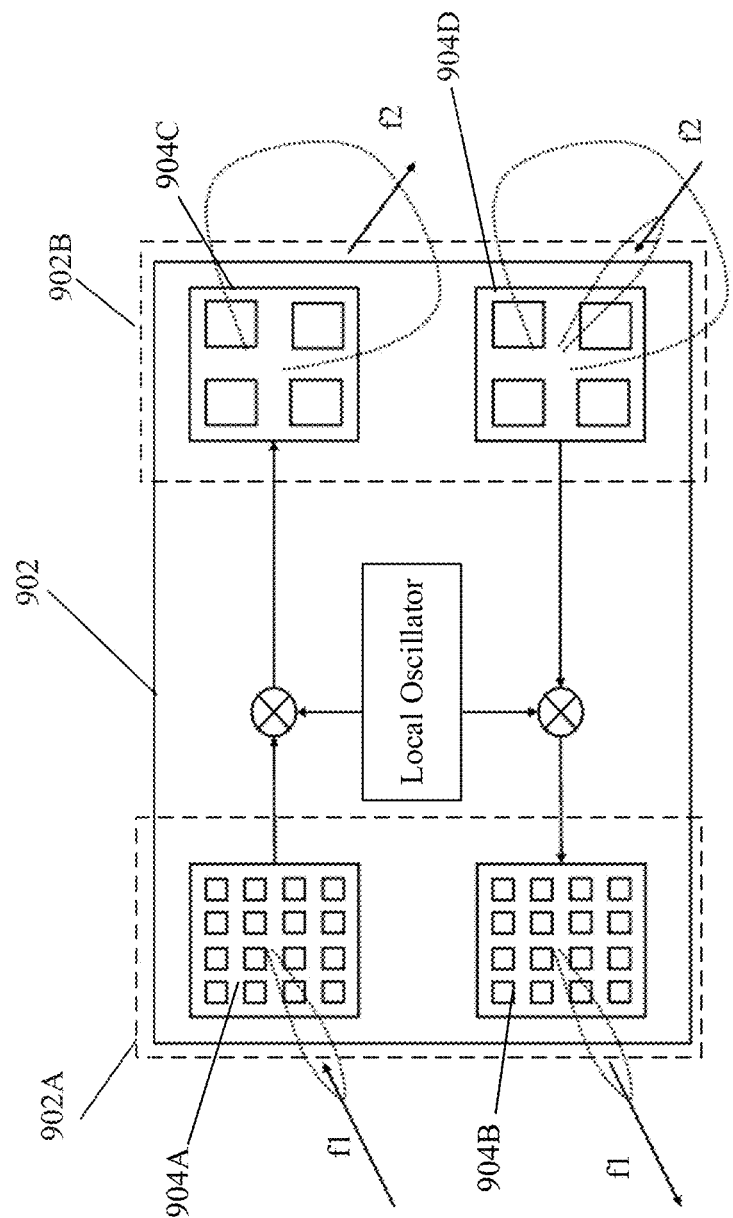
FIG. 9 is an illustration of a RF repeater device of a repeater system, in accordance with yet another exemplary embodiment of the disclosure.

FIG. 9 is an illustration of a RF repeater device of a repeater system, in accordance with yet another exemplary embodiment of the disclosure. FIG. 9 is explained in conjunction with elements from FIGS. 1A to 1C and 2 to 8. With reference to FIG. 9, there is shown a RF repeater device 902 implemented as a frequency-converting repeater that operate in a multi-frequency network of repeaters. The RF repeater device 902 corresponds to the RF repeater device 802 and first RF repeater device 104, and may be a part of the repeater system 102 (that is one of the network of RF repeater devices).

Sub-6 GHz Access RF repeater device: In this embodiment, a propagation frequency on the second side 902B of the RF repeater device 902 belongs to some low carrier frequency bands (e.g., LTE bands, Wi-Fi bands in 2.4 GHz/5 GHz, 3.6 GHz CBRS band, etc.), as compared to the propagation frequency on the first side 902A of the RF repeater device 902. As a result, smaller number of antenna elements in second antenna arrays 904C and 904D may be provided in the RF repeater device 902 to propagate waveforms in lower frequencies as compared to a number of antenna elements in first antenna arrays 904A and 904B of the RF repeater device 902. Smaller number of antenna elements may create wider radiation patterns, thereby providing broader coverage and lessening the need for fast/accurate beam tracking. In some embodiments, the RF repeater device 902 may utilize only a single radiating element or antenna element at the second side 902B of the RF repeater device 902, operating at low radio frequency.

Figure 10:
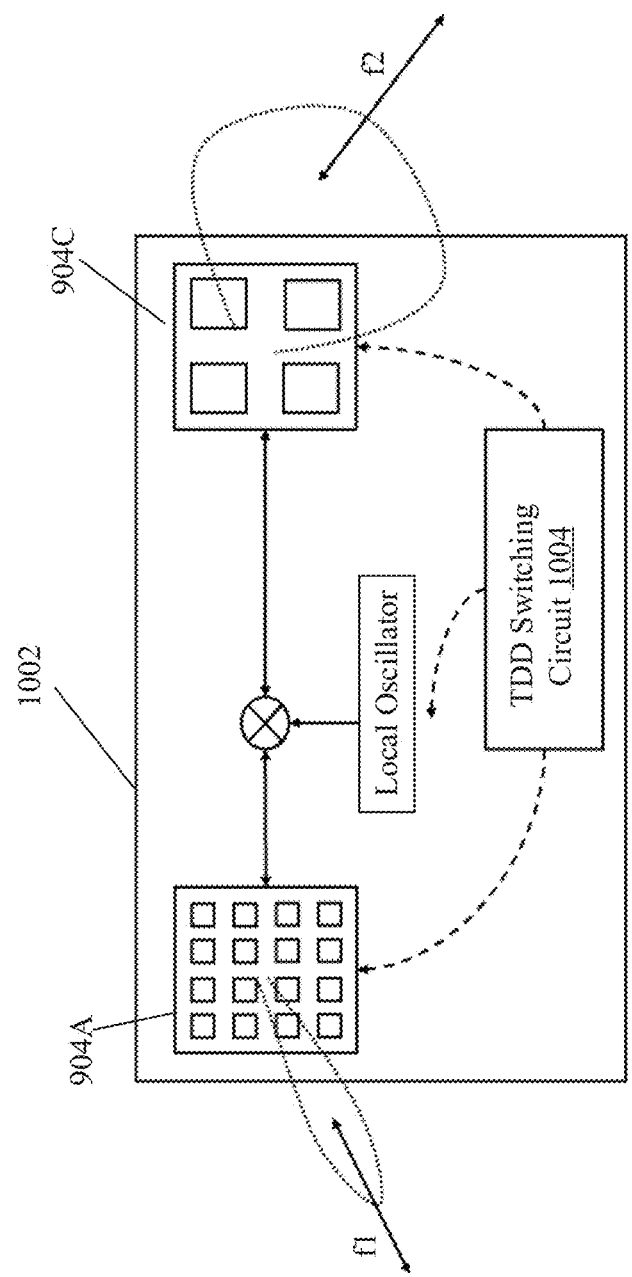
FIG. 10 is an illustration of a RF repeater device of a repeater system, in accordance with yet another exemplary embodiment of the disclosure.

FIG. 10 is an illustration of a RF repeater device of a repeater system, in accordance with yet another exemplary embodiment of the disclosure. FIG. 10 is explained in conjunction with elements from FIGS. 1A to 1C and 2 to 9. With reference to FIG. 10, there is shown a RF repeater device 1002 implemented as a frequency-converting repeater that operate in a multi-frequency network of repeaters. The RF repeater device 1002 corresponds to the RF repeater device 902 and first RF repeater device 104, and may be a part of the repeater system 102 (that is one of the network of RF repeater devices).

Sub-6 GHz Access RF repeater device for time division duplex (TDD): In some embodiments, the RF repeater device 902 (of FIG. 9) implementation may be modified for TDD operation as shown, for example, in the RF repeater device 1002 in the FIG. 10. In this case, a TDD switching circuit 1004 may be provided to adjust settings on various components within the RF repeater device 1002 to follow the uplink/downlink allocation of TDD time slots. Based on allocation or direction of a link, the TDD switching circuit 1004 may be configured to determine and configure a direction of operation for each side of the RF repeater device 1002 in a dynamic or static manner. The TDD switching circuit 1004 may also be referred to as a TDD switching engine.

Figure 11:
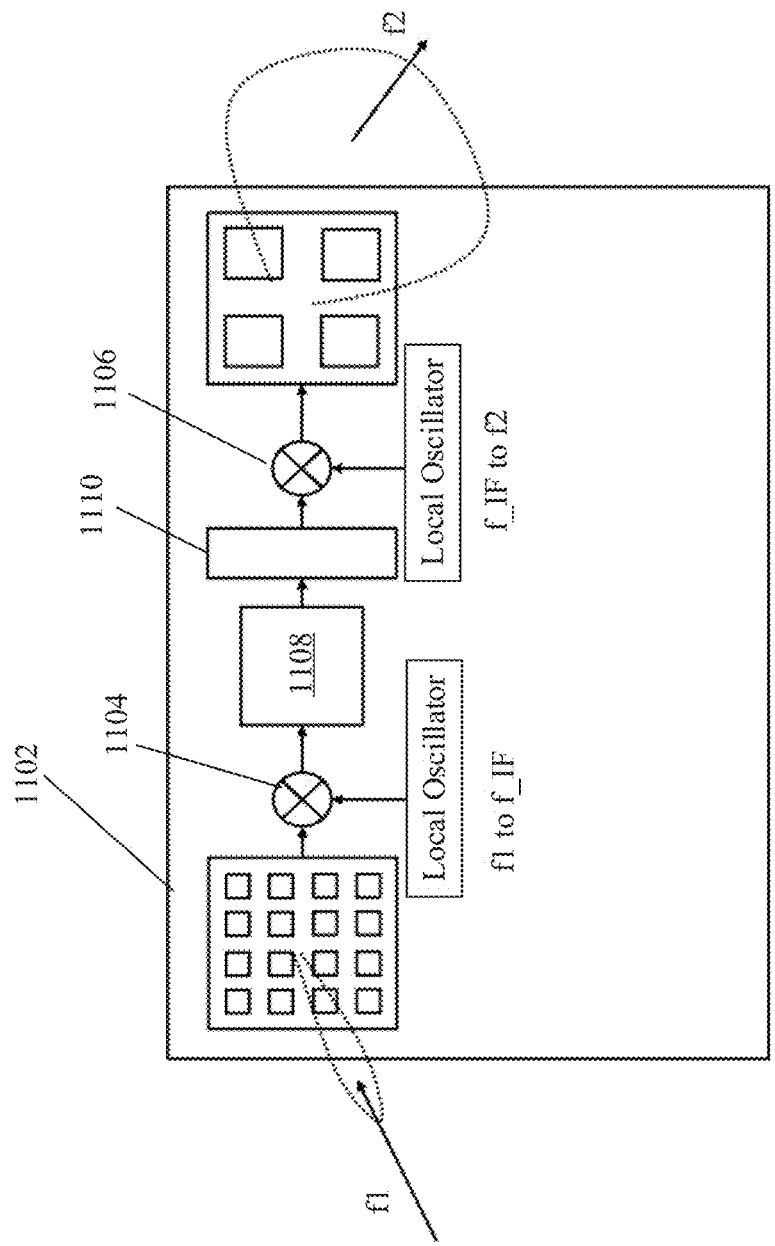
FIG. 11 is an illustration of a RF repeater device of a repeater system, in accordance with yet another exemplary embodiment of the disclosure.

FIG. 11 is an illustration of a RF repeater device of a repeater system, in accordance with yet another exemplary embodiment of the disclosure. FIG. 11 is explained in conjunction with elements from FIGS. 1A to 1C and 2 to 10. With reference to FIG. 11, there is shown a RF repeater device 1102 implemented as a frequency-converting repeater that operate in a multi-frequency network of repeaters. The RF repeater device 1102 corresponds to the RF repeater devices 902 and 1002 and the first RF repeater device 104, and may be a part of the repeater system 102 (that is one of the network of RF repeater devices). There is further shown a frequency down-converter 1104, a frequency up-converter 1106, a filer 1108 (e.g. a band-pass filter or a low-pass filter), and an impairment correction circuit 1110 in the RF repeater device 1102.

RF repeater device with Low Intermediate-Frequency (Low-IF): In some embodiments, the RF repeater device 1102 may deploy an internal intermediate frequency for frequency-shifting an incoming waveform, as shown in the FIG. 11, in an example. In this case, an incoming waveform may be first down-converted to an intermediate frequency (IF frequency) using a frequency down-converter 1104 (e.g., a mixer). The intermediate frequency may be a low IF frequency value (e.g., between 0 and original radio frequency f1), or be a zero value (e.g., the incoming signal being down converted to absolute baseband). The down-converted waveform may be then up-converted to final f2 frequency using a frequency up-converter 1106.

In some embodiments, the following functions and/or processing may be provisioned within the repeater signal path: A) the filter 1108 may be configured to execute low-pass or band-pass filtering to filter out any adjacent signal (i.e. a blocker/noise) around a signal-of-interest, once the incoming waveform is down-converted to IF/zero frequency; B) the RF repeater device 1102 may be configured to execute gain adjustment, to control the power of signal radiating on the outgoing signal of the RF repeater device 1102; C) the impairment correction circuit 1110 may be configured to execute impairment corrections, which include: in-phase quadrature-phase (I/Q) imbalance correction, and frequency-domain correction of in-band frequency roll-off.

Figure 12:
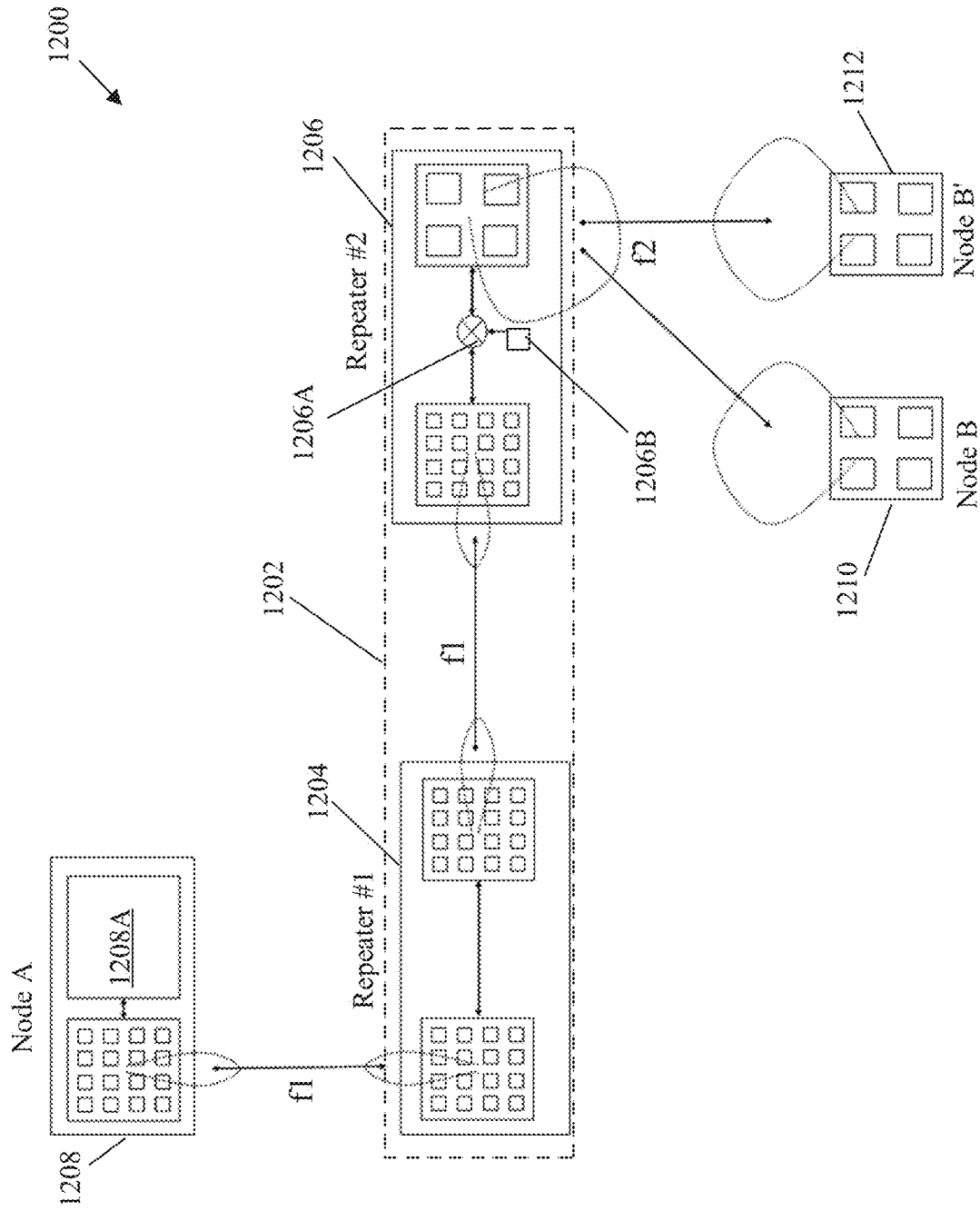
FIG. 12 is an illustration of a scenario for implementation of a repeater system in a communication system, in accordance with an exemplary embodiment of the disclosure.

FIG. 12 is an illustration of a scenario for implementation of a repeater system in a communication system, in accordance with an exemplary embodiment of the disclosure. FIG. 12 is explained in conjunction with elements from FIGS. 1A to 1C and 2 to 11. With reference to FIG. 12, there is shown a communication system 1200 that may include a repeater system 1202 that include a first RF repeater device 1204 and a second RF repeater device 1206. In FIG. 12, the communication system 1200 represents a frequency f1 to a frequency f2 deployment scenario, where the target source node, such as a source node 1208 (Node A) is configured to operate at a first propagation frequency f1 and target destination nodes, such as a first destination node 1210 (Node B) and a second destination node 1212 (Node B') are configured to operate at a second propagation frequency f2 that is different from the first propagation frequency f1.

In an example, the first propagation frequency f1 may be a mmWave frequency, whereas the second propagation frequency f2 may be a in a Citizens Broadband Radio Service (CBRS) band, for example, 3.6 GHz CBRS, and the like (e.g. a sub-6 GHz frequency). The repeater system 1202 that includes the first RF repeater device 1204 and the second RF repeater device 1206 may be utilized to provide and improve the links (connections) between the source node 1208 (Node A) and the first destination node 1210 (Node B) and the second destination node 1212 (Node B'). The source node 1208 may include a digital signal processor 1208A that is configured to execute baseband processing operations including beamforming to communicate mmWave signal (at the first propagation frequency f1) to the first RF repeater device 1204. The source node 1208 (node A) may be configured to operate at a first carrier frequency (e.g. f1, such as a mmWave signal) and the one or more destination nodes are configured to operate at a second carrier frequency (e.g. f2, such as sub-6 GHz). The first RF repeater device 1208 may be configured to control the one or more second RF repeater devices, such as the second RF repeater device 1206, in the network of RF repeater devices to convert the first carrier frequency (e.g. f1) to the second carrier frequency (e.g. f2) to close a communication link. In this embodiment, the first RF repeater device 1202 (repeater #1) uses the first propagation frequency f1 as both incoming and outgoing frequency and does not perform any frequency conversion to a lower frequency. The second RF repeater device 1204 uses the first propagation frequency f1 as incoming frequency and the second propagation frequency f2 as outgoing frequency, where ultimate destination nodes Node B/B' (i.e. the first destination node 1210 and the second destination node 1212) receive their signals at access frequency f2 via a wide beam (as shown), and the frequency conversion occurs at the second RF repeater device 1204 using a frequency up-converter 1206A in association with a local oscillator 1206B.

In some embodiments, all digital and baseband processing for links to/from Nodes B and B' (i.e. the first destination node 1210 and the second destination node 1212) may be performed centrally at the source node 1208 (Node A). The repeater system 1202 may not perform any waveform processing, hence keeping the latency through the network of RF repeater devices close to zero (e.g., orders of 10s of nanosecond). For example, the source node 1208 (Node A) may be an LTE/5G-NR base station, and the nodes B/B' may be complete standalone UEs attached to base station Node A. All user/network management functions as well as digital processing of signals/streams may be performed by Node A through its embedded digital unit, such as the digital signal processor 1208A The repeater system 1202 (Repeaters #1/#2) may not perform demodulation/re-modulation of data streams, although the second RF repeater device 1206 (Repeater #2) may act as an access point (or small cell) providing access to end users, such as the Nodes B/B', and provide coverage to end users at propagation frequency f2. All baseband/digital processing to support and maintain connections to the nodes B/B' may be performed and managed by the source node 1208 (Node A).

Figure 13:
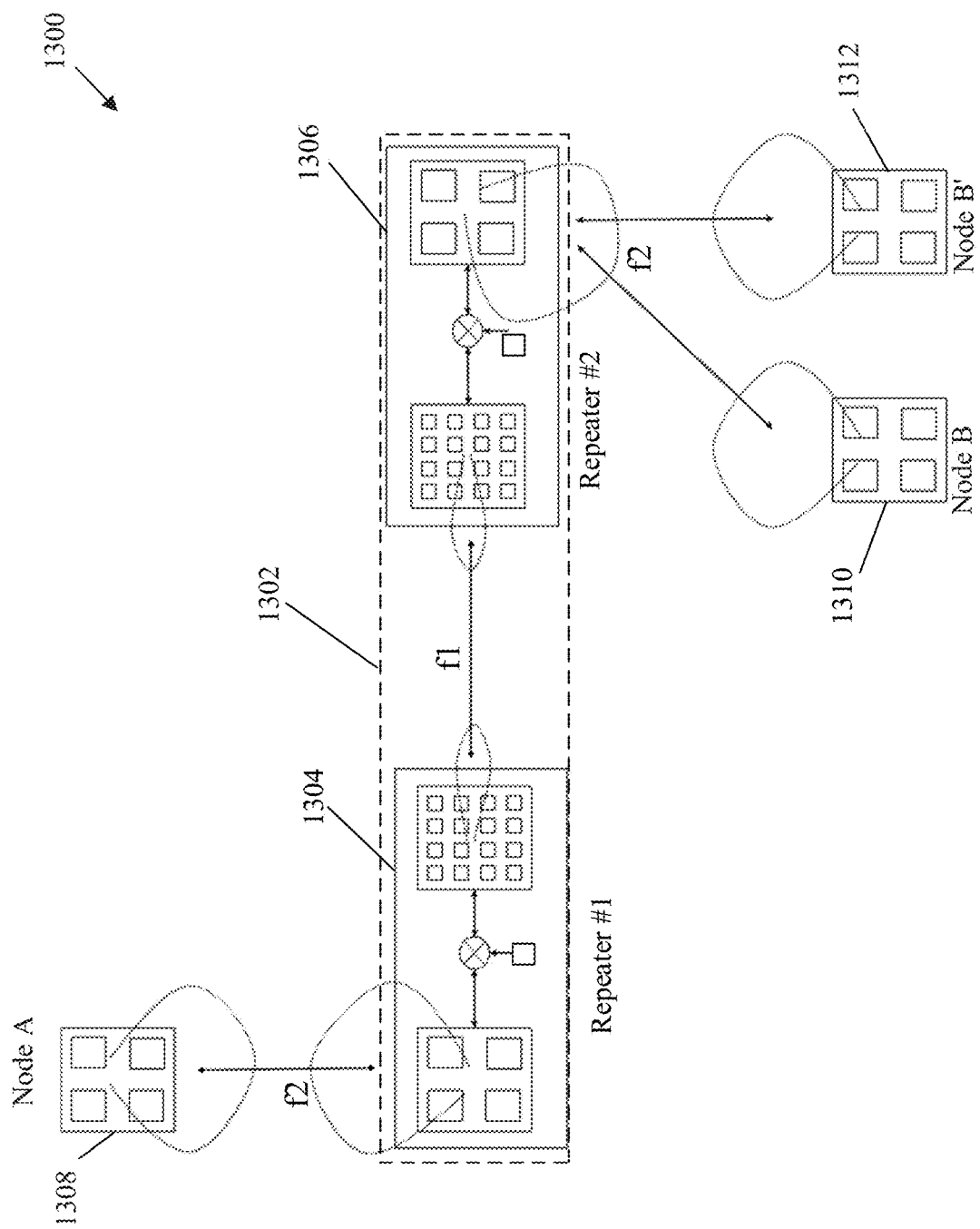
FIG. 13 is an illustration of a scenario for implementation of a repeater system in a communication system, in accordance with an exemplary embodiment of the disclosure.

FIG. 13 is an illustration of a scenario for implementation of a repeater system in a communication system, in accordance with an exemplary embodiment of the disclosure. FIG. 13 is explained in conjunction with elements from FIGS. 1A to 1C and 2 to 12. With reference to FIG. 13, there is shown a communication system 1300 that may include a repeater system 1302 that include a first RF repeater device 1304 and a second RF repeater device 1306. In FIG. 13, the communication system 1300 represents frequency f2-to-f2 deployment scenario, where the target source node, such as a source node 1308 (Node A) as well as the target destination nodes, such as a first destination node 1310 (Node B) and a second destination node 1312 (Node B') are configured to operate at a same propagation frequency f2.

In this embodiment, for illustration purposes, the source node 1308 (Node A), the first destination node 1310 (Node B), and the second destination node 1312 (Node B') are depicted to use larger and comparatively smaller number of antenna elements (larger wavelength) corresponding to lower RF frequencies. As an example, Node A, Node B, Node B' all may be designed to operate in an LTE band, CBRS band, or sub-6 GHz Wi-Fi band. In this deployment scenarios, the source and destination nodes (Node A, B, and B') may operate at a frequency f2, whereas the first RF repeater device 1304 and the second RF repeater device 1306 in between are operating at frequency f1 at portion of the signal propagation trajectory.

In an example, the first RF repeater device 1304 (repeater #1) may be configured to utilize frequency f2 as incoming frequency, and frequency f1 as outgoing frequency. With no loss of generality, frequency f1 in this example belongs to a mmWave (high frequency) band, as comparatively smaller antenna elements are needed (for shorter wavelength). In such an example, the frequency f2 may be in 3.6 GHz CBRS band, and frequency f1 may be in 60 GHz band. The link between the first RF repeater device 1304 (repeaters #1) and the second RF repeater device 1306 (repeater #2) may be then established at frequency f1, where ultimate destination nodes (Node B/B') receive their signals at access frequency f2. By use of comparatively larger number of antenna elements at frequency f1, narrows beams are established for the link between the first RF repeater device 1304 (repeaters #1) and the second RF repeater device 1306 (repeater #2), as shown, in an example. In some embodiments, the locations of the first RF repeater device 1304 (repeaters #1) and the second RF repeater device 1306 (repeater #2) may be stationary, where beams may be adjusted/trained in an infrequent rate, eliminating need for fast/complex beam tracking methods.

In some embodiments, each of the first destination node 1310 (Node B) and a second destination node 1312 (Node B') may be configured to share same time-slots for receiving their respective data through frequency-division-multiple-access methods (FDMA), such as OFDMA, by allocating different sets of subcarriers within OFDMA symbol, to different end users (e.g., Node B and B'). In some embodiments, additional RF repeater devices (e.g., repeater #3) may be placed in between the first RF repeater device 1304 (repeaters #1) and the second RF repeater device 1306 (repeater #2) in case the distance between two RF repeater devices is too long to close the link. In this case, the additional RF repeater devices in between may operate as f1-in f1-out configuration (single frequency; no-frequency-shifting), or the additional RF repeater devices may alternatively convert the waveform back-and-forth between f1 and a third frequency f3. The use of third frequency f3 may be utilized to minimize/eliminate coupling/self-interference between the incoming and outgoing waveforms on the same RF repeater device.

Figure 14:
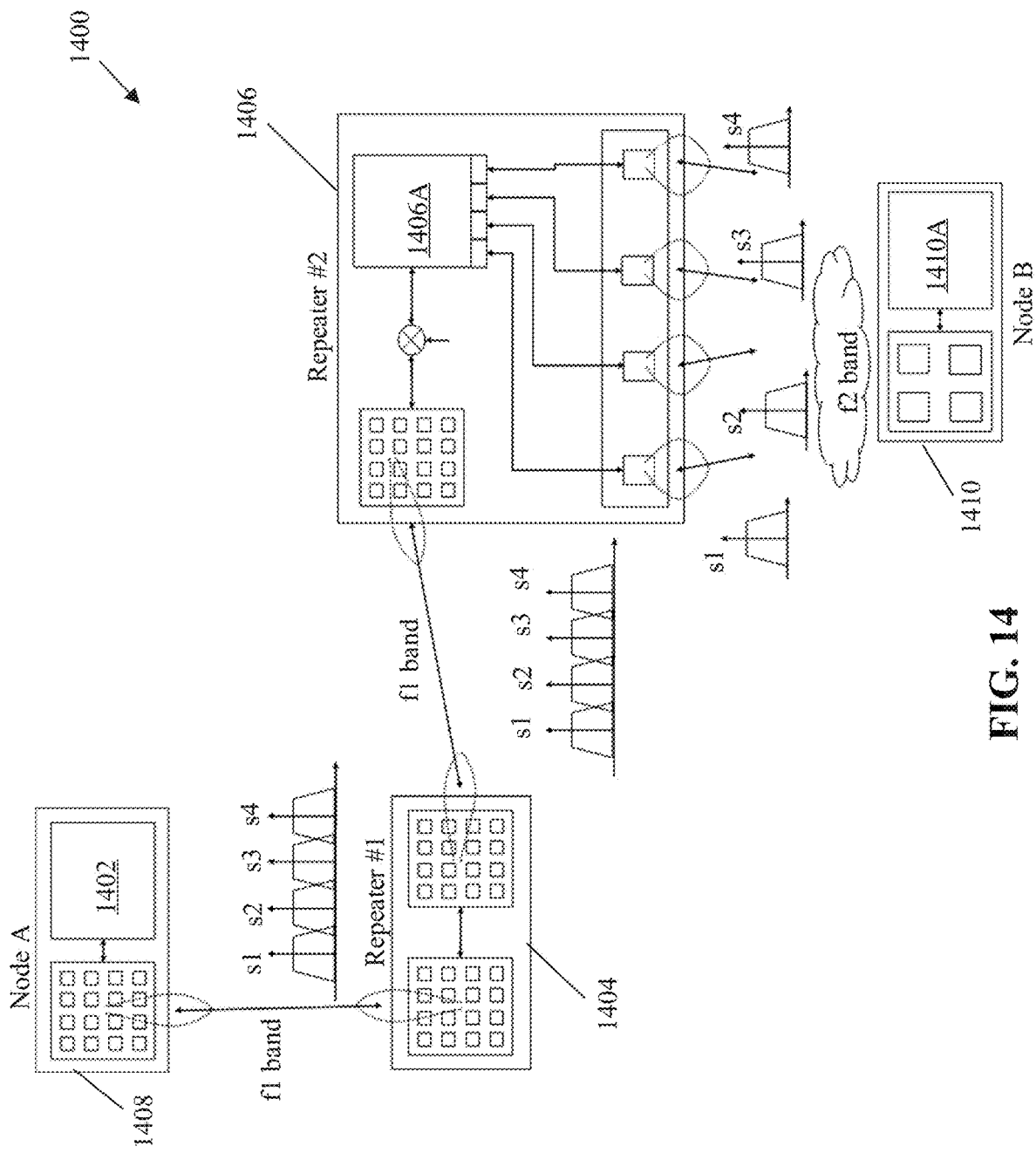
FIG. 14 is an illustration of a scenario for implementation of a repeater system in a communication system, in accordance with another exemplary embodiment of the disclosure.

FIG. 14 is an illustration of a scenario for implementation of a repeater system in a communication system, in accordance with another exemplary embodiment of the disclosure. FIG. 14 is explained in conjunction with elements from FIGS. 1A to 1C and 2 to 13. With reference to FIG. 14, there is shown a communication system 1400 that may include a first RF repeater device 1404 and a second RF repeater device 1406 of a repeater system.

Access Repeater with MIMO Support: For the sake of discussion and description, the second RF repeater device 1406 that wirelessly connects with the destination node 1410 (Node B) may also be referred to as "Access Repeater", which indicate that the second RF repeater device 1406 (i.e. Repeater #2) acts as the last of the network of RF repeater devices, which provide access to end users at access frequency f2. Alternatively, one or more RF repeater devices, such as the first RF repeater device 1404 that close the link in between a source node 1408 (Node A) and the access repeater may be referred to as a "Backhaul Repeater".

In some embodiments, the "Access Repeater" may be configured and provisioned to support multi-input multi-output (MIMO) operation between the access repeater (such as the second RF repeater device 1406) and the destination node 1410 (Node B, e.g., user equipment), where this MIMO communication may be conducted at frequency f2 (e.g., lower band, such CBRS). This mode of operation is beneficial and advantageous, given that the propagation at lower frequency f2 results in rich scattering channel response, which leads to better MIMO capacity and MIMO performance.

The following are some exemplary embodiments and operations of the repeater system and methods with support for MIMO. In an example, a 4-stream MIMO link is created over the access link between the access repeater (i.e. the second RF repeater device 1406; Repeater #2) and the destination node 1410 (Node B). This link may be established over access frequency band f2 (typically in sub 6 GHz), which generally demonstrates good MIMO channel properties and MIMO gain. In this example, streams s1, s2, s3, and s4 represent the four data streams after MIMO coding is applied on some original (information) data streams. In some embodiments, this MIMO processing may be performed in the "Digital Unit", such as a digital signal processor 1402, provided in the source node 1408 (Node A).

In some embodiments, the four MIMO codes streams s1, s2, s3, s4 may be transported over the same channel (or sub-channel) within band of f2. In other words, these 4 streams may have same center frequency and form a MIMO communication over same channel. In the FIG. 14, a 4×4 antenna configuration is depicted between the second RF repeater device 1406 (Repeater #2) and the destination node 1410 (Node B) (4 transmit antenna elements at Repeater #2 and 4 receive antenna elements at Node B). This is only one exemplary antenna configuration, and any other combination of antennas and streams may be utilized.

In some embodiments, the access repeater (i.e. the second RF repeater device 1406; Repeater #2), may be configured to perform the following functions: A) down-conversion of the signals received through the first RF repeater device 1404 (Repeater #1) at f1 band to a lower frequency band (access band) of f2. B) receiving of the four streams s1, s2, s3, s4 (aggregated in frequency domain within band f1), and dis-aggregation of such streams (through channel selection filtering and other operations as needed, such as frequency shifting, multiplexing or demultiplexing by a processor 1406A), to transmit the four streams over the same frequency channel inside band f2, each stream radiating through one of the antenna elements in the second RF repeater device 1406 (Repeater #2).

In some embodiments, and as shown in the FIG. 14, the four streams s1, s2, s3, s4 may arrive at the access repeater (i.e. the second RF repeater device 1406; Repeater #2), at four different channels, such as {stream s1 at channel "f1_1", stream s2 at f1_2, stream s3 at f1_3, and stream s4 at f1_4}. These four streams s1, s2, s3, s4 may be then transported over same channel (f2_0), to create a MIMO link between the access repeater (i.e. the second RF repeater device 1406; Repeater #2) and the destination node 1410 (Node B).

In some embodiments, the MIMO processing for the destination node 1410 (Node B) may be done locally inside the destination node 1410 (Node B) by a processor 1410A (e.g. like typically done by a UE in a wireless network). Additionally, MIMO processing for network side of link is performed inside the source node 1408 (Node A, for example, by the digital signal processor 1402). In this case, no MIMO processing may be performed by any of the RF repeater devices between the source node 1408 (Node A) and the destination node 1410 (Node B). In the case of MIMO processing (including any MIMO pre-coding, MIMO decoding) being performed centrally inside the source node 1408 (Node A), it includes both downlink MIMO processing (e.g., MIMO pre-coding) and uplink MIMO processing (e.g., MIMO decoding).

In some embodiments, the source node 1408 (Node A) and the destination node 1410 (Node B), may be configured to perform channel measurement functions that estimate the effective MIMO channel between the source node 1408 (Node A) and the destination node 1410 (Node B), and which may include the contributions of RF repeater devices in the end-to-end MIMO channel response, as well as the propagations in frequency band f2. The estimated MIMO channel responses may be then used to perform MIMO pre-coding and decoding at both ends of the link, depending on direction of link.

In some embodiments, the propagation channel between the source node 1408 (Node A), and the RF repeater devices (such as the first RF repeater device 1404 and the second RF repeater device 1406) may be static (i.e. stationary), where the beams between the RF repeater devices may be trained or re-trained very infrequently. Alternatively, the channel between the second RF repeater device 1406 (Repeater #2) and the destination node 1410 (Node B) may be dynamic and varying at a fast rate. Same or similar channel estimation pilots (signals) embedded in the MIMO waveforms may be used by the source node 1408 (Node A) and the destination node 1410 (Node B) to estimate and track MIMO channel impulse response in a dynamic manner and use that for MIMO pre-coding and/or MIMO decoding.

In some embodiments, the aggregation of waveforms coming out of the source node 1408 (Node A), i.e., {s1 @f1_1, s2 @f1_2, s3 @f1_3, s4 @f1_4} may take different orders/spacing. With no loss of generality, some variations may include, but are not limited to: A) in a first case, the signals may be placed next to each other in the frequency domain, thereby minimizing the frequency gaps between the four waveforms in the frequency domain, B) in another case, the signals may be placed with some gap/guard interval in between to ease the selection filtering needed to select and disaggregate these waveforms, C) in a third case, if a large amount of spectrum is available (e.g., 7 GHz of unlicensed spectrum in V-band), these four waveforms s1 to s4 may be placed with large gaps (defined gaps) in between. This is done to minimize sensitivity and degradation due to other interfering signals operating in the f1 band. For example, in V-band case, other links may exist occupying 1.76 GHz of spectrum at a time. Furthermore, assume the case, where the waveforms s1, s2, s3, s4, each occupy 400 MHz spectrum. Thus, packing all four streams next to each other in frequency domain would occupy a bandwidth of ~1.6 GHz. In this case, if a 1.76 GHz interfering signal may impact/overlap with all four stream at same time, and hence likely disrupt the link. In some embodiments, streams s1, s2, s3, s4 may be placed in frequency domain with ~2 GHz gap in between adjacent streams. In such a case, a presence (or appearance) of a 1.76 GHz interfering signal may only overlap and impact one out of four streams. Given the MIMO and channel coding applied on the four streams, there may be a higher probability that the original information stream may be recovered at a receiver, given the redundancy in the correction capability embedded into the streams being transmitted over the air.

In some embodiments, each RF repeater device in the network of RF repeater device may be configured to apply a multi-stream gain adjustment or equalization on the four streams S1, S2, S3, S4 throughout the chain of RF repeater devices. This relative gain adjustment may be applied in one or a plurality of repeaters of the network of RF repeater devices. This gain adjustments may be applied on the incoming waveforms/streams or outgoing waveforms/streams. This relative gain adjustment/equalization may be applied for different purposes and/or due to different conditions, including but not limited to: A) to compensate for gain imbalances throughout the repeater chain. For example, if stream s1 experiences some gain attenuation/dispersion due to its center frequency, its power would be adjusted/recovered to same level as other adjacent waveforms. This may be performed to prevent the out-of-channel radiation/leakage levels of one of the streams to overwhelm and/or degrade the signal quality of another stream of the four streams with lower absolute power level; B) to compensate for gain imbalance between the streams s1 to s4 due to propagation differences experienced over frequency band f2, for links between the second RF repeater device 1406 (Repeater #2) and the destination node 1410 (Node B). For example, the streams s1 to s4 received by different antennas of the second RF repeater device 1406 (Repeater #2), during uplink (the destination node 1410 (Node B) towards the source node 1408 (Node A)), may have very different relative signals levels. Aggregating these received signals next to each other in the frequency domain, may potentially degrade the signal quality of weaker signals, due to leakage of out-of-band emissions of stronger signals. To address this issue, some relative gain equalization may be applied inside second RF repeater device 1406 (Repeater #2) before aggregating the four streams s1 to s4 and sending them up towards the first RF repeater device 1404 (Repeater #1). In some embodiments, the relative gain values may be coordinated, or shared with, or set by the source node 1408 (Node A). This is to enable the baseband processing (MIMO pre-coding, decoding) to take into this gain adjustment (which is not part of actual channel propagation between the second RF repeater device 1410 (Repeater #2) and the destination node 1410 (Node B) in their MIMO processing.

In an exemplary implementation, the f1 band corresponds to a mmWave signal and the f2 band corresponds to the CBRS band.

Figure 15:
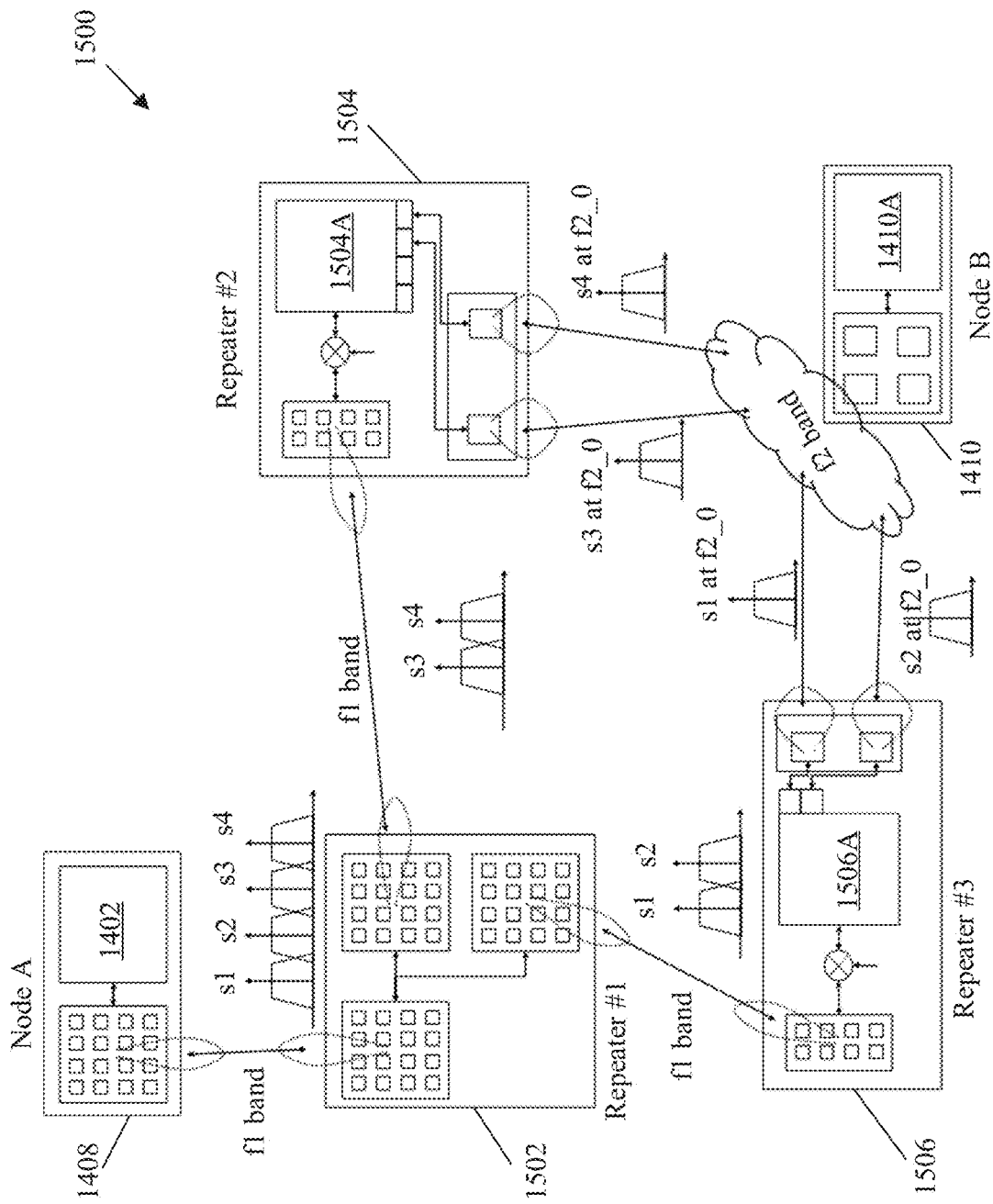
FIG. 15 is an illustration of a scenario for implementation of a repeater system in a communication system, in accordance with another exemplary embodiment of the disclosure.

FIG. 15 is an illustration of a scenario for implementation of a repeater system in a communication system, in accordance with another exemplary embodiment of the disclosure. FIG. 15 is explained in conjunction with elements from FIGS. 1A to 1C and 2 to 14. With reference to FIG. 15, there is shown a communication system 1500 that may include RF repeater devices 1502, 1504, and 1506 in a repeater system. There is further shown the source node 1408 (Node A) and the destination node 1410 (Node B) (of FIG. 14).

Access Multi-Repeaters with Distributed MIMO Support: In this embodiment, multiple RF repeater devices, such as the RF repeater devices 1502, 1504, and 1506, provide access to the destination node 1410 (Node B), by transporting multiple streams concurrently and over same frequency channel to the end user, such as to the destination node 1410 (Node B). Some exemplary embodiments and features (in various cases) are described below (where a subset or all of features may be utilized or deployed in a repeater system.

In a first case, two RF repeater devices 1504 and 1506 (Repeater #2 and Repeater #3) may provide links to the destination node 1410 (Node B) in frequency band f2. In a second case, incoming or downlink signals may be transported to the access repeaters (i.e. the RF repeater devices 1504 and 1506) over a mmWave band (e.g., band f2). While the RF repeater devices 1504 and 1506 perform frequency shifting (between f1 and f2), the RF repeater devices 1502 (repeater #1) may be configured to provide waveform steering and amplification, without applying any frequency shifting.

In a third case, the access repeaters (i.e. the RF repeater devices 1504 and 1506) may be further configured to receive their respective signals from same repeater (e.g. the RF repeater device 1502; repeater #1), or they may establish their connections to the source node 1408 (Node A) through different repeaters in the network of repeaters deployed. In a fourth case, the RF repeater device 1502 (Repeater #1) may be further configured to use different antenna arrays (as shown in the FIG. 15), or same antenna arrays (array panel) with multi-beam/stream capability, to establish links in band f2 with the RF repeater devices 1504 and 1506 (repeaters #2 and #3).

In a fourth case, distributed MIMO communication may be established between the source node 1408 (Node A) and the destination node 1410 (Node B), where combination of MIMO channels between the RF repeater device 1504 (Repeater #2) and the destination node 1410 (Node B) and the RF repeater device 1506 (Repeater #3) and the destination node 1410 (Node B), forms a MIMO channel with larger dimensions. In an example, as shown, each channel may be a 2×4 MIMO link, where superset of these channels, may construct an effective 4×4 MIMO link.

In a fifth case, all baseband/MIMO/digital processing (such as MIMO pre-coding, decoding) on network side may be performed centrally inside the source node 1408 (Node A) (or in a virtualized Node B). In this case, the RF repeater devices 1502, 1504, and 1506 (repeaters #1, #2, #3) may not perform or apply any digital processing on the streams s1 to s4, resulting in nearly zero latency through the network of repeaters.

In a sixth case, a plurality of repeaters with {f1-in, f1-out} configuration may be utilized to extend the range of coverage for the source node 1408 (Node A). For example, the RF repeater device 1502 (repeater #1) may be replaced by a mesh of RF repeater devices that may take in signals in band f1 and transmit over in band f1 (e.g., mesh of RF repeater devices operating in band f1).

In a seventh case, the links between the RF repeater devices 1502 and 1504 {repeater #1, repeater #2}, and the RF repeater devices 1502 and 1506 {repeater #1, repeater #3} may be established using narrow beams in mmWave band f1, using an array of antenna elements with phase shifters. The steerable phased-array-based antenna panels may be configured and trained to find the best or suitable propagation paths between the respective RF repeater devices.

In a seventh case, for the RF repeater device 1502 (repeater #1), where incoming/outgoing frequencies operate in same frequency band, following techniques may be used to mitigate self-interference: A) methods by using beam pattern and polarization optimization to null/mitigate self-interference or reflections from objects in vicinity, or B) by allocating non-overlapping channels (or sub-channels) within the band f1.

Figure 16:
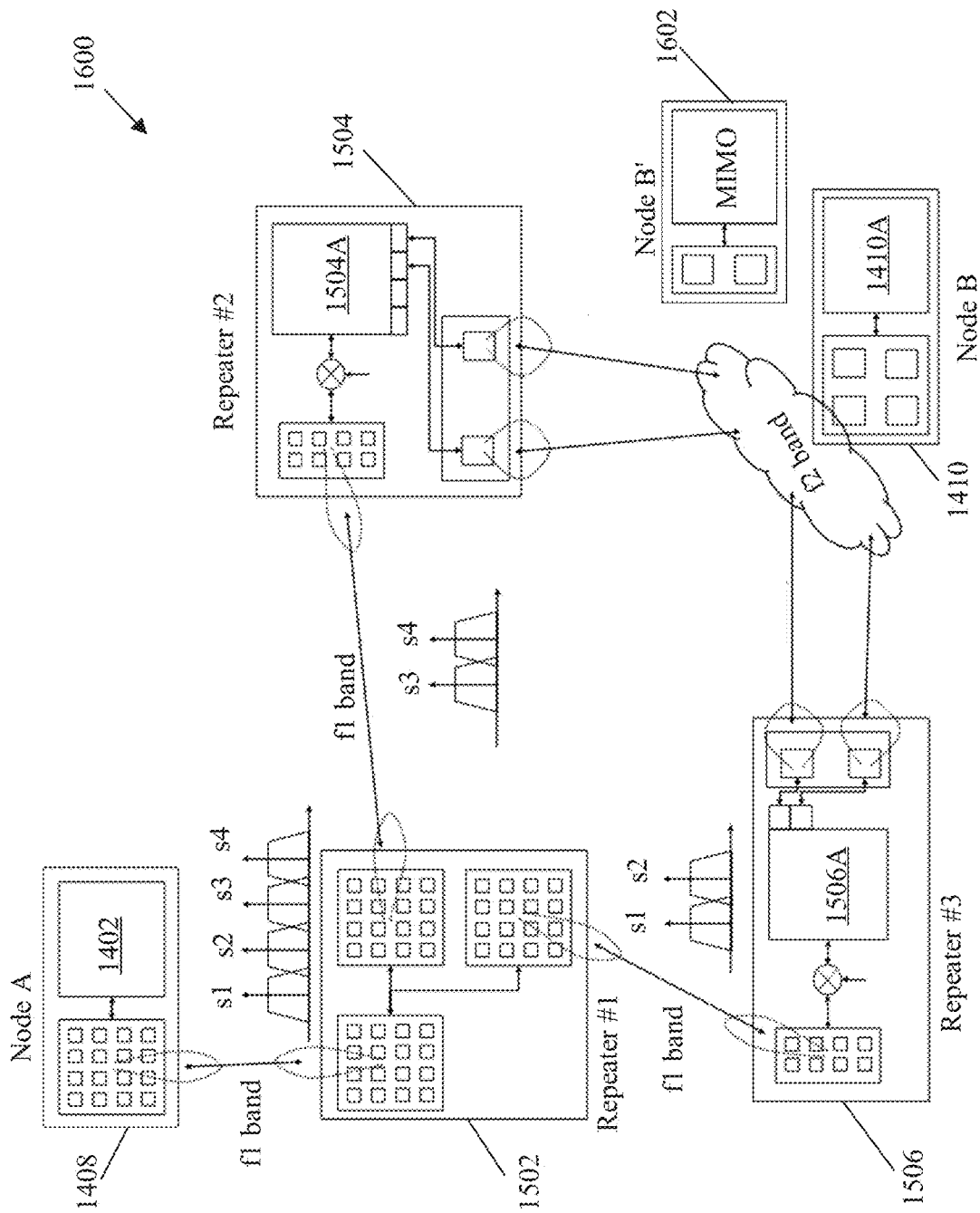
FIG. 16 is an illustration of a scenario for implementation of a repeater system in a communication system, in accordance with another exemplary embodiment of the disclosure.

FIG. 16 is an illustration of a scenario for implementation of a repeater system in a communication system, in accordance with another exemplary embodiment of the disclosure. FIG. 16 is explained in conjunction with elements from FIGS. 1A to 1C and 2 to 15. With reference to FIG. 16, there is shown a communication system 1600 that may include RF repeater devices 1502, 1504, and 1506 in a repeater system. There is further shown the source node 1408 (Node A), the destination node 1410 (Node B) (of FIG. 14) and another destination node 1602 (Node B′).

Access Multi-Repeaters with Distributed Multi-User MIMO Support: In this embodiment, multiple end-users, such as destination nodes 1410 and 1602 (e.g., Node B/B') may be supported by a plurality of access repeaters (i.e. the RF repeater devices 1504 and 1506) that provide propagation coverage to the destination nodes 1410 and 1602 (Nodes B/B'). In some embodiments, the data streams generated and originated at the source node 1408 (Node A) may include data for both end users, such as the destination nodes 1410 and 1602 (e.g., Node B/B' multiplexed in frequency using OFDMA method). In some embodiments, the source node 1408 (Node A) may be configured to generate streams s1, s2, s3, s4, to form a multi-user MIMO communication link between the antennas of the RF repeater devices 1504 and 1506 (repeaters #2 and #3) and the destination nodes 1410 and 1602 (e.g., Node B and B'). Moreover, in some embodiments, resource blocks (sub-carriers according to OFDMA protocol) within streams s1, s2, s3 and s4 may be assigned to each end user, such as each destination nodes 1410 and 1602 (e.g., Node B/B'). In this case, the destination nodes 1410 and 1602 (e.g., Node B/B') may be concurrently serviced in same frequency band or channel and in same frame or time slot.

In some embodiments, all of the 3 above described methods, operations, features, and systems may be applied to an FDD system, where uplink and downlink streams are concurrently transported over two different frequency bands. In this case, the uplink and downlink streams may utilize same physical antennas (wideband antennas), or separate/different physical antennas.

In some embodiments, the RF repeater devices of the network of RF repeater devices may have internal circuitry, blocks, function to detect the TDD slot allocations for uplink/downlink. This may be used for switching ON/OFF and direction of blocks with each RF repeater device based on direction of links for a given time slot. In some embodiments, the assignment of time slots for TDD uplink/downlink may be communicated to the RF repeater devices over a control channel/plane, where this control plane may be an out-of-band channel (such as a low data rate LTE link), or in-band control channel embedded into the streams traveling through the RF repeater devices in the network of RF repeater devices configured or re-configured in one or more topologies.

In some embodiments, the access repeaters (providing access to end users in lower frequency band) may form a "Distributed Antenna System (DAS)", where multiple access repeaters provide signals to end users, such as destination nodes. In some embodiments, same end user may be receiving MIMO signal streams, concurrently from multiple Access Repeaters. In some embodiments, the MIMO streams transmitted by multiple of access repeaters (such as RF repeater devices 1504 and 1506) for a distributed or coordinated MIMO access, where individual MIMO streams transmitted by distributed access repeaters are centrally (or jointly) generated/coded in the base stations (e.g., Node A).

In some embodiments, frequency allocation coordination may be utilized over the links between a given destination node (Node B), RF repeater devices, and in between RF repeater devices, to mitigate or minimize interference between the links within band f1. This coordination may be performed by various circuitry or engines inside a given source node (Node A), by collecting and analyzing a subset of information about deployment locations or orientation of RF repeater devices in the network of RF repeater devices arranged in a given topology, and signal/interference power measurements conducted or reported by the RF repeater devices. For example, links with high level of cross-leakage in band f1, may be allocated non-overlapping channels within band f1. In other cases, beam pattern optimization methods may be used to mitigate interference between links, through creating nulling or rejection regions within the beam patterns of antenna arrays of the RF repeater devices in the network of RF repeater devices.

In some embodiment, no hard or explicit handoff may be utilized when a user (e.g., Node B) enters or exits the coverage region of a given access repeater. The end user (Node B), may implicitly (seamlessly) be transitioning from the propagation coverage of one access repeater into another access repeater's coverage region, or into the source node's (Node A's) direct coverage. Since all the signal processing is done centrally inside the Node A, the transition from one access repeater domain into another repeater access's domain does not require any handoff process or special user management services.

In some embodiments, OFDMA waveforms and protocols may be used by a given source node (Node A), to support multiple end users (UEs, Node B/B') over same time slot and frequency channel, as a means of multiple access mechanism. In other embodiments, TDD and FDD signaling may be utilized.

In some embodiments, each access repeater may only contain one radiating element in band f2, which may transmit signal to the destination node (Node B). In this case, each access repeater may operate as one antenna in plurality of antennas needed for MIMO communication to end user Node B, where other access repeaters each act as other antenna elements of the MIMO system. In this case, the MIMO streams for all these individual antenna elements inside access repeaters, may be generated/coded centrally inside the given destination node (Node B).

In some embodiments, adjacent access repeaters (operating in band f2), may each be allocated non-overlapping portions of a frequency band. This allows the adjacent access repeaters covering end users, deliver traffic and data streams over different sub-channels. This mode of operation allows for wireless-like partitioning of coverage for each access repeater. Moreover, this allows for frequency reuse, across a network of access repeaters, by alternately allocating non-overlapping frequency sub-channels to adjacent access repeaters (or cells). In some embodiments, the allocation and coordination of frequency sub-channels to access repeaters may be managed by the source node (Node A), one of network of RF repeater devices, or a central communication device (e.g. a cloud server with a network management engine).

In some embodiments, a given network node (e.g. Node A) may use communication system and methods according to 3GPP standards and specifications. For example, Node A may act as an eNB per LTE (EUTRA) specifications under 3GPP, and Node B/B' may be two User Equipment (UEs). In some embodiments, the Node A may use specifications as per New Radio (NR) system defined under 3GPP (also known as 5G NR). In this case, the Node A may operate as gNB per 5G NR specifications. In some other embodiments, the Node A may use specifications per various versions of IEEE 802.11 standard (e.g., 802.11ac, 802.11ax, etc.). In this case, the Node A may act as an access point per 802.11 specifications and devices Node B/B act as STAs under 802.11 specifications.

Figure 17:
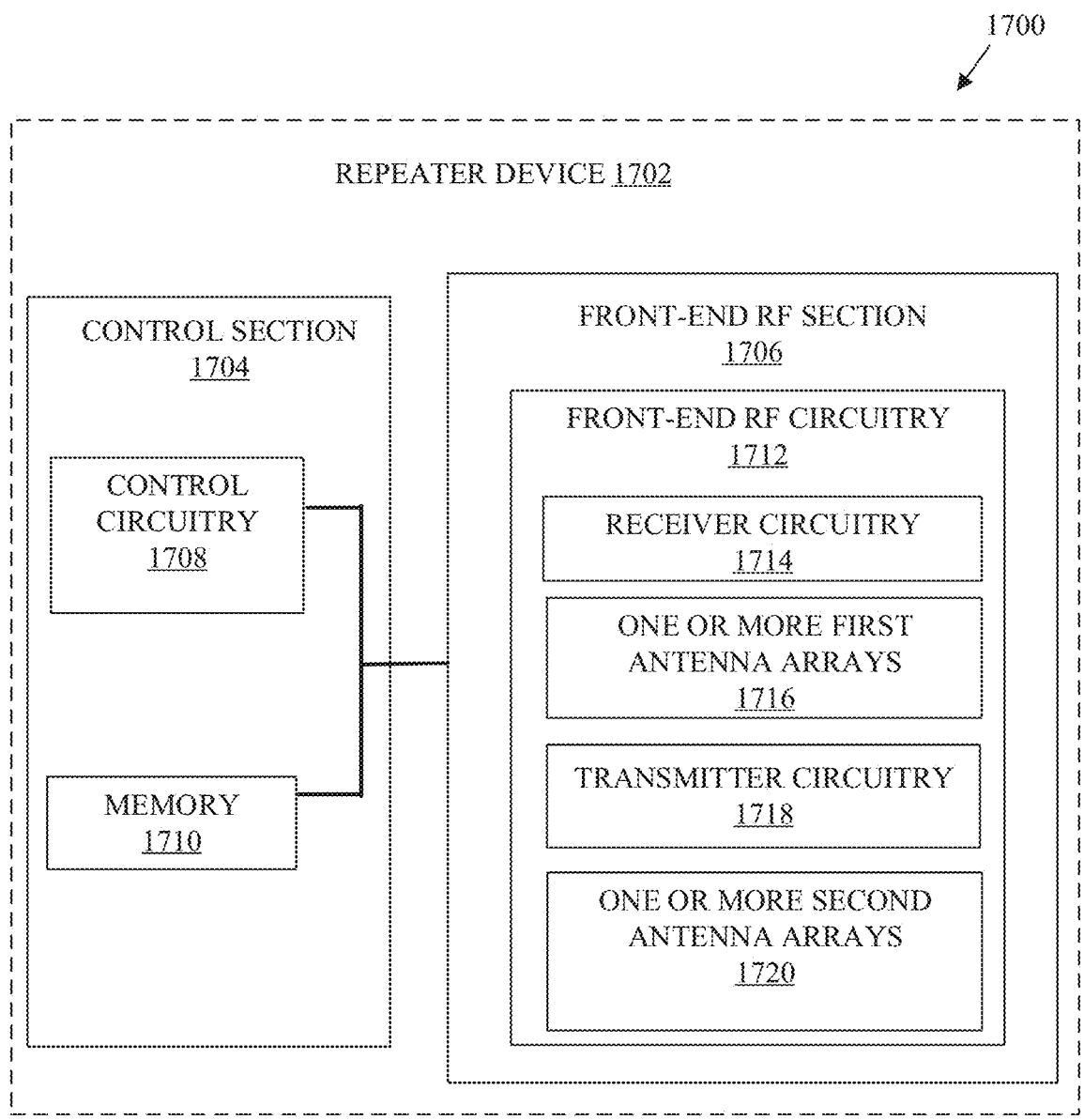
FIG. 17 is a block diagram illustrating various components of an exemplary RF repeater device of a repeater system, in accordance with an exemplary embodiment of the disclosure.

FIG. 17 is a block diagram illustrating various components of an exemplary RF repeater device of a repeater system, in accordance with an exemplary embodiment of the disclosure. FIG. 17 is explained in conjunction with elements from FIGS. 1 to 12. With reference to FIG. 17, there is shown a block diagram 1700 of a RF repeater device 1702. The RF repeater device 1702 may be an example of a RF repeater device used in the repeater system 102, 202, 1202, or 1302, in FIGS. 1A to 1C, 2 to 16. For example, the RF repeater device 1702 may correspond to the first RF repeater device 104, the second RF repeater device 106, or the RF repeater device 602, 702, 802, 902, 1002, 1102, 1204, 1206, 1304, 1306, 1404, 1406, 1502, 1504, or 1506, or other RF repeater devices, such as an access repeater or a backhaul repeater. The RF repeater device 1702 may include a control section 1704 and a front-end RF section 1706. The control section 1704 may include control circuitry 1708 and a memory 1710. The control section 1704 may be communicatively coupled to the front-end RF section 1706. The front-end RF section 1706 may include front-end RF circuitry 1712. The front-end RF circuitry 1712 may further include a receiver circuitry 1714, one or more first antenna arrays 1716, a transmitter circuitry 1718, and one or more second antenna arrays 1720.

The control circuitry 1708 may be configured to execute various operations of the RF repeater device 1702. The control circuitry 1708 include suitable logic, circuitry, and/or interfaces configured to control various components of the front-end RF circuitry 1712. The RF repeater device 1702 may be a programmable device, where the control circuitry 1708 may execute instructions stored in the memory 1710. Example of the implementation of the control circuitry 1708 may include, but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

The memory 1710 may be configured store values, such as the plurality of measurements associated with each of the source node 108, the first destination node 110, the second destination node 112, and various RF repeater devices of the repeater system 102, 202, 1202, or 1302. The memory 1710 may be further configured store the plurality of signal parameters (e.g. the complex coefficients). Examples of the implementation of the memory 1710 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 1704 may further include one or more other components, such as an analog to digital converter (ADC), a digital to analog (DAC) converter, a wireless modem, such as the 5G NR modem 708, mixers, up/down converters, local oscillators, WLAN connection circuits for BT/wi-fi links, filters, impairment correction circuits, and the like, which are omitted in this figure for brevity.

The front-end RF circuitry 1712 includes the receiver circuitry 1714 and the transmitter circuitry 1718. The receiver circuitry 1714 is coupled to the one or more first antenna arrays 1716, or may be a part of the receiver chain. The transmitter circuitry 1718 may be coupled to the one or more second antenna arrays 1720. The front-end RF circuitry 1712 supports multiple-input multiple-output (MIMO) operations, and may be configured to execute MIMO communication with a plurality of end-user devices. The MIMO communication may be executed at a sub 6 gigahertz (GHz) frequency or even mmWave frequency.

The receiver circuitry 1714 may be configured to control the one or more first antenna arrays 1716 which are configured to receive one or more beams of RF signals carrying one or more data streams from a source network node (e.g. the source node 108 or node A). In an example, the receiver circuitry 1714 may include a cascading receiver chain comprising various components for baseband signal processing or digital signal processing. For example, the receiver circuitry 1714 may include a cascading receiver chain comprising various components (e.g., the one or more first antenna arrays 1716, a set of low noise amplifiers (LNA), a set of receiver front end phase shifters, and a set of power combiners) for the signal reception (not shown for brevity).

The transmitter circuitry 1718 may be configured to further forward the received one or more beams of RF signals carrying the one or more data streams to a destination network node (e.g. the first destination node 110 or node B). The transmitter circuitry 1718 may be configured to control the one or more one or more second antenna arrays 1720. In an example, transmitter circuitry 1718 may include a cascading transmitter chain comprising various components for baseband signal processing or digital signal processing.

In various embodiments, described, for example, in FIGS. 1A to 1C, and 2 to 16, where the one or more first antenna arrays 1716 receives a signal and re-transmits the signal through the one or more second antenna arrays 1720, additional processing/operation may be applied to the signal between the one or more first antenna arrays 1716 and the corresponding transmitting array of the one or more second antenna arrays 1720. For example, the received signal may be: 1) frequency shifted to a frequency other than input carrier frequency, 2) passed through phase and gain adjustment, such as the gain and phase control operation may be applied, 3) passed through low-pass or band-pass filtering, 4) digitized and processed in digital domain before re-transmission, or 5) digitized, de-modulated, re-modulated and re-transmitted.

Figure 18:
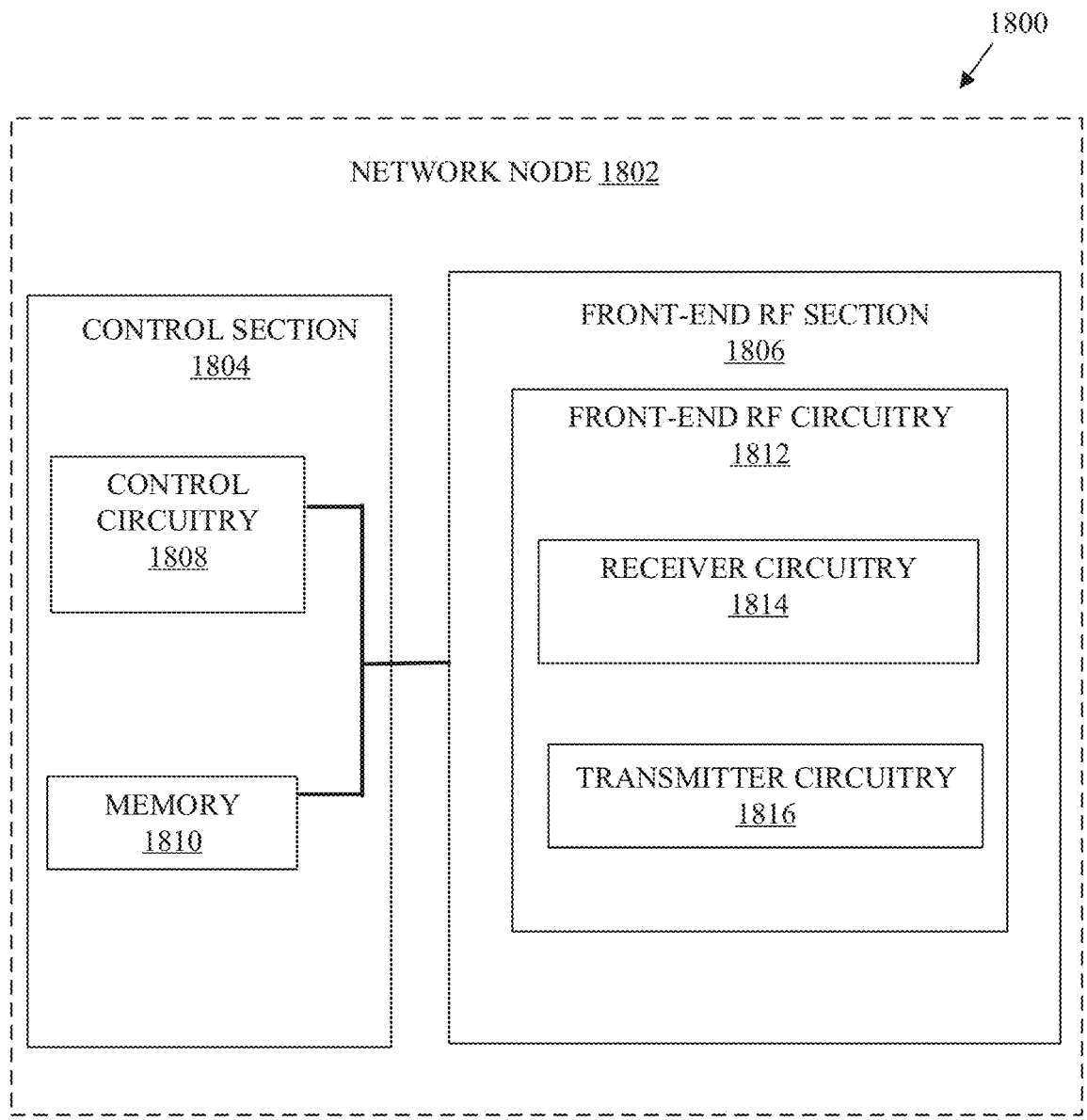
FIG. 18 is a block diagram illustrating various components of an exemplary network node, in accordance with an exemplary embodiment of the disclosure.

FIG. 18 is a block diagram illustrating various components of an exemplary network node, in accordance with an exemplary embodiment of the disclosure. FIG. 18 is explained in conjunction with elements from FIGS. 1A to 1C, and 2 to 17. With reference to FIG. 18, there is shown a block diagram 1800 of a network node 1802. The network node 1802 may correspond to the Node A (e.g. the source node 108) or Node B/B' (e.g. the first destination node 110 or the second destination node 112). The network node 1802 may include a control section 1804 and a front-end RF section 1806. The control section 1804 may include control circuitry 1808 and a memory 1810. The control section 1804 may be communicatively coupled to the front-end RF section 1806. The front-end RF section 1806 may include front-end RF circuitry 1812. The front-end RF circuitry 1812 may further include a receiver circuitry 1818 and a transmitter circuitry 1816. The front-end RF circuitry 1812 may further include one or more antenna or antenna arrays depending on implementation (not shown for the sake of brevity). Examples of the implementation of the control circuitry 1808, the memory 1810 may correspond to the examples of implementation of the control circuitry 1708 and the memory 1710, respectively.

The front-end RF circuitry 1812 includes the receiver circuitry 1814 and the transmitter circuitry 1816. The receiver circuitry 1814 may be configured to receive one or more beams/streams from one or more RF repeater devices, such as the RF repeater device 1702, or directly from another network nodes in a network. The front-end RF circuitry 1812 supports MIMO processing and operations, and may be configured to execute MIMO communication with the one or more RF repeater devices and end-user devices. The MIMO communication may be executed at a sub 6 gigahertz (GHz) frequency or mmWave frequency. The transmitter circuitry 1816 may be configured to transmit one or more beams of RF signals carrying one or more data streams to a destination network node (node B) via one or multiple communication paths through the one or more RF repeater devices of a repeater system (e.g. the repeater system 102, 202, 1202, or 1302).

Figure 19A:
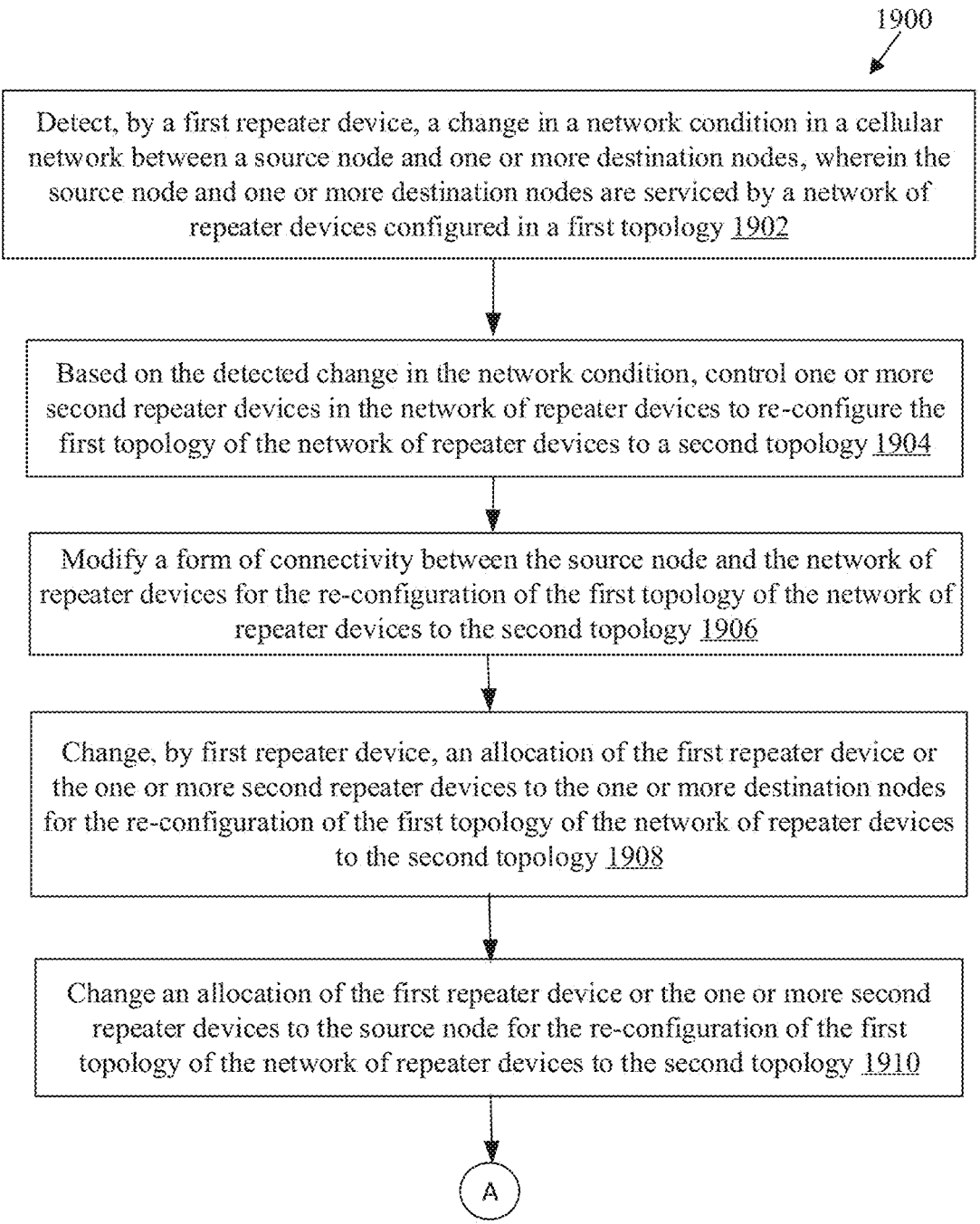
FIG. 19A and FIG. 19B, collectively, is a flowchart that illustrates a method for high performance wireless communication, in accordance with an embodiment of the disclosure.
Figure 19B:
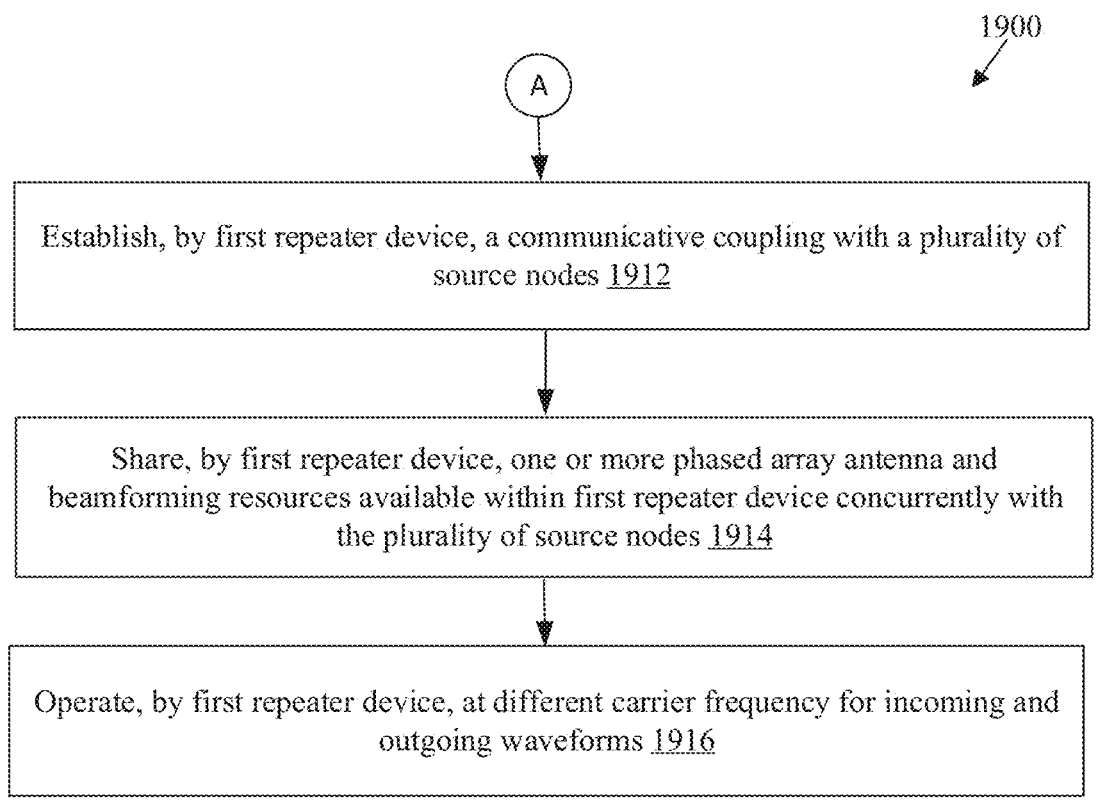

FIGS. 19A and 19B, collectively, is a flowchart that illustrates a method for wireless communication utilizing RF repeater devices, in accordance with an embodiment of the disclosure. FIGS. 19A and 19B, are explained in conjunction with elements from FIGS. 1A to 1C, and 2 to 18. With reference to FIGS. 19A and 19B, there is shown a flowchart 1900 comprising exemplary operations 1902 through 1916. The method may be implemented in a repeater system, such as the repeater system 102, 202, 1202, or 1302. In an example, the method may be executed by one of the network of RF repeater devices, such as the first RF repeater device 102, or a central communication device having a network management engine.

At 1902, a change in a network condition in a wireless network may be detected between a source node (Node A) and one or more destination nodes (Node B and B'). The source node and one or more destination nodes may be serviced by a network of RF repeater devices configured in a first topology.

At 1904, based on the detected change in the network condition, the one or more second RF repeater devices in the network of RF repeater devices may be controlled (e.g. by the first RF repeater device 104) to re-configure the first topology of the network of RF repeater devices to a second topology. The re-configuration of the first topology of the network of RF repeater devices to the second topology may be executed at least to continue to service the source node and the one or more destination nodes in the cellular/wireless network in the changed network condition. Various embodiments and operations related to dynamic re-configuration of a given topology of the network of RF repeater devices, has been described in detail, for example, in FIGS. 1A, 1B, 1C, and 2 to 7.

At 1906, a form of connectivity may be modified between the source node and the network of RF repeater devices for the re-configuration of the first topology of the network of RF repeater devices to the second topology.

At 1908, an allocation of the first RF repeater device or the one or more second RF repeater devices to the one or more destination nodes may be changed (e.g. by the first RF repeater device 104 or the central communication device) for the re-configuration of the first topology of the network of RF repeater devices to the second topology.

At 1910, an allocation of the first RF repeater device 104 or the one or more second RF repeater devices to the source node may be changed (e.g. by the first RF repeater device 104 or the central communication device) for the re-configuration of the first topology of the network of RF repeater devices to the second topology.

At 1912, a communicative coupling may be established (e.g. by the first RF repeater device 104) with a plurality of source nodes.

At 1914, one or more phased array antenna and beamforming resources available within the first repeater node 104 may be shared (e.g. by the first RF repeater device 104) concurrently with the plurality of source nodes.

At 1916, the first RF repeater device 102 (or one or more RF repeater devices of the network of RF repeater devices) may be operated at different carrier frequency for incoming and outgoing waveforms. In a case where the carrier RF frequency of incoming and outgoing signals are different, such configuration may be utilized, for 1) better utilization of spectral channels, 2) better overall frequency planning of network, and 3) better isolation between the two antenna arrays inside a given RF repeater device operating at same time or channel. Various embodiments and operations related to use of different carrier frequency for incoming and outgoing waveforms, has been described in detail, for example, in FIGS. 8 to 16.

Various embodiments of the disclosure may provide a non-transitory computer-readable medium having stored thereon, computer implemented instructions that when executed by a computer causes a communication apparatus to execute operations, the operations comprising detecting, by the first RF repeater device 104, a change in a network condition in a wireless network between the source node a source node and one or more destination nodes, wherein the source node and one or more destination nodes are serviced by a network of RF repeater devices configured in a first topology; and based on the detected change in the network condition, controlling, by the first RF repeater device 102, one or more second RF repeater devices in the network of RF repeater devices to re-configure the first topology of the network of RF repeater devices to a second topology, wherein the re-configuration of the first topology of the network of RF repeater devices to the second topology is executed at least to continue to service the source node and the one or more destination nodes in the wireless network in the changed network condition.

Various embodiments of the disclosure may a repeater system, for example, the repeater system 102, 202, 1202, or 1302, in FIGS. 1A to 1C, 2 to 16. The repeater system includes the first RF repeater device (e.g. the first RF repeater device 104, or the RF repeater device 602, 702, 802, 902, 1002, 1102, 1204, 1206, 1304, 1306, 1404, 1406, 1502, 1504, 1506, or 1702) arranged in a first topology of a network of RF repeater devices and is configured to communicate with one or more second RF repeater devices (e.g. the second RF repeater device 106 or the RF repeater device 602, 702, 802, 902, 1002, 1102, 1204, 1206, 1304, 1306, 1404, 1406, 1502, 1504, or 1506) in the network of RF repeater devices to service a source node (e.g. the source node 108, 208, 502, 504, 1208, 1308, 1408, the network node 1802, or Node A) and one or more destination nodes (Node B/B') in a wireless network. The first RF repeater device 104 or 1702 may be further configured to: detect a change in a network condition in the wireless network between the source node (e.g. the source node 108, 208, 502, 504, 1208, 1308, 1408, the network node 1802, or Node A) and the one or more destination nodes; and based on the detected change in the network condition, control the one or more second RF repeater devices in the network of RF repeater devices to re-configure the first topology of the network of RF repeater devices to a second topology, wherein the re-configuration of the first topology of the network of RF repeater devices to the second topology is executed at least to continue to service the source node (e.g. the source node 108, 208, 502, 504, 1208, 1308, 1408, the network node 1802, or Node A) and the one or more destination nodes in the wireless network in the changed network condition.

In accordance with an embodiment, wherein the change in the network condition in the wireless network is triggered by at least one of: a blockage of one or more communication links in the wireless network, a movement of the source node (e.g. the source node 108, 208, 502, 504, 1208, 1308, 1408, the network node 1802, or Node A) or the one or more destination nodes, a movement of one or more RF repeater devices that are mobile in the network of RF repeater devices, a change in a number of nodes in the wireless network to be serviced, or a change in a demand for a throughput, a quality-of-service, or a quality-of-experience. In accordance with an embodiment, the first RF repeater device 104 or 1702 is further configured to modify a form of connectivity between the source node (e.g. the source node 108, 208, 502, 504, 1208, 1308, 1408, the network node 1802, or Node A) and the network of RF repeater devices in the re-configuration of the first topology of the network of RF repeater devices to the second topology. In accordance with an embodiment, the first RF repeater device 104 or 1702 is further configured to change an allocation of the first RF repeater device 104 or 1702 or the one or more second RF repeater devices to the one or more destination nodes in the re-configuration of the first topology of the network of RF repeater devices to the second topology. In accordance with an embodiment, the first RF repeater device 104 or 1702 is further configured to change an allocation of the first RF repeater device 104 or 1702 or the one or more second RF repeater devices to the source node (e.g. the source node 108, 208, 502, 504, 1208, 1308, 1408, the network node 1802, or Node A) in the re-configuration of the first topology of the network of RF repeater devices to the second topology.

In accordance with an embodiment, the first RF repeater device 104 or 1702 is further configured to modify a number of beams allocated to one or more of: the first RF repeater device 104 or 1702, the one or more second RF repeater devices in the network of RF repeater devices, the source node (e.g. the source node 108, 208, 502, 504, 1208, 1308, 1408, the network node 1802, or Node A), or the one or more destination nodes in the re-configuration of the first topology of the network of RF repeater devices to the second topology. In accordance with an embodiment, the first RF repeater device 104 or 1702 is further configured to: establish a communicative coupling with a plurality of source nodes (e.g. the source node 502 and 504); and share one or more phased array antenna and beamforming resources available within the first RF repeater device 104 or 1702 concurrently with the plurality of source nodes (e.g. the source node 502 and 504).

In accordance with an embodiment, the control of the one or more second RF repeater devices in the network of RF repeater devices is executed via an in-band communication between the first RF repeater device 104 or 1702 and the one or more second RF repeater devices. In accordance with an embodiment, the control of the one or more second RF repeater devices in the network of RF repeater devices is executed via an out-of-band communication between the first RF repeater device 104 or 1702 and the one or more second RF repeater devices.

In accordance with an embodiment, the first RF repeater device 104 or 1702 is further configured to operate at different carrier frequency for incoming and outgoing waveforms. The first RF repeater device 104 or 1702 comprises one or more first antenna arrays and one or more second antenna arrays antennas, and wherein the first RF repeater device 104 or 1702 has a first side facing substantially towards the source node (e.g. the source node 108, 208, 502, 504, 1208, 1308, 1408, the network node 1802, or Node A) and a second side that is opposite the first side and faces substantially towards the one or more destination nodes, and wherein the first RF repeater device 104 or 1702 is further configured to receive and transmit waveforms on each of the first side and the second side via different antenna arrays of the first RF repeater device 104 or 1702.

In accordance with an embodiment, the first RF repeater device 104 or 1702 further comprises one or more first antenna arrays and one or more second antenna arrays, and wherein the first RF repeater device 104 or 1702 has a first side facing substantially towards the source node (e.g. the source node 108, 208, 502, 504, 1208, 1308, 1408, the network node 1802, or Node A) and a second side that is opposite the first side and faces substantially towards the one or more destination nodes, and wherein the first RF repeater device 104 or 1702 is further configured to receive and transmit waveforms on the first side via a same antenna array of the one or more first antenna arrays. The first RF repeater device 104 or 1702 is further configured to receive and transmit waveforms on the second side via a same antenna array of the one or more second antenna arrays, wherein the transmit and receive time slots are non-overlapping.

In accordance with an embodiment, the first RF repeater device 104 or 1702 and the one or more second RF repeater devices in the network of RF repeater devices in the second topology are configured to operate at a first carrier frequency for inter-repeater signal propagation, and wherein the source node (e.g. the source node 108, 208, 502, 504, 1208, 1308, 1408, the network node 1802, or Node A) and the one or more destination nodes are configured to operate at a second carrier frequency. In accordance with an embodiment, the source node (e.g. the source node 108, 208, 502, 504, 1208, 1308, 1408, the network node 1802, or Node A) is configured to operate at a first carrier frequency (f1) and the one or more destination nodes are configured to operate at a second carrier frequency (f2), and wherein the first RF repeater device 104 or 1702 is further configured to control the one or more second RF repeater devices in the network of RF repeater devices to convert the first carrier frequency (f1) to the second carrier frequency (f2) to close a communication link.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A repeater system, comprising:
a first RF repeater device arranged in a first topology of a network of RF repeater devices and is configured to communicate with one or more second RF repeater devices in the network of RF repeater devices to service a source node and one or more destination nodes in a wireless network,
wherein the first RF repeater device is further configured to:
detect a change in a network condition in the wireless network between the source node and the one or more destination nodes; and
based on the detected change in the network condition, control the one or more second RF repeater devices in the network of RF repeater devices to re-configure the first topology of the network of RF repeater devices to a second topology, wherein the re-configuration of the first topology of the network of RF repeater devices to the second topology is executed at least to continue to service the source node and the one or more destination nodes in the wireless network in the changed network condition.

2. The repeater system according to claim 1, wherein the change in the network condition in the wireless network is triggered by at least one of: a blockage of one or more communication links in the wireless network, a movement of the source node or the one or more destination nodes, a movement of one or more RF repeater devices that are mobile in the network of RF repeater devices, a change in a number of nodes in the wireless network to be serviced, or a change in a demand for a throughput, a quality-of-service, or a quality-of-experience.

3. The repeater system according to claim 1, wherein the first RF repeater device is further configured to modify a form of connectivity between the source node and the network of RF repeater devices in the re-configuration of the first topology of the network of RF repeater devices to the second topology.

4. The repeater system according to claim 1, wherein the first RF repeater device is further configured to change an allocation of the first RF repeater device or the one or more second RF repeater devices to the one or more destination nodes in the re-configuration of the first topology of the network of RF repeater devices to the second topology.

5. The repeater system according to claim 1, wherein the first RF repeater device is further configured to change an allocation of the first RF repeater device or the one or more second RF repeater devices to the source node in the re-configuration of the first topology of the network of RF repeater devices to the second topology.

6. The repeater system according to claim 1, wherein the first RF repeater device is further configured to modify a number of beams allocated to one or more of: the first RF repeater device, the one or more second RF repeater devices in the network of RF repeater devices, the source node, or the one or more destination nodes in the re-configuration of the first topology of the network of RF repeater devices to the second topology.

7. The repeater system according to claim 1, wherein the first RF repeater device is further configured to:
establish a communicative coupling with a plurality of source nodes; and
share one or more phased array antenna and beamforming resources available within the first RF repeater device concurrently with the plurality of source nodes.

8. The repeater system according to claim 1, wherein the control of the one or more second RF repeater devices in the network of RF repeater devices is executed via an in-band communication between the first RF repeater device and the one or more second RF repeater devices.

9. The repeater system according to claim 1, wherein the control of the one or more second RF repeater devices in the network of RF repeater devices is executed via an out-of-band communication between the first RF repeater device and the one or more second RF repeater devices.

10. The repeater system according to claim 1, wherein the first RF repeater device is further configured to operate at different carrier frequency for incoming and outgoing waveforms.

11. The repeater system according to claim 1, wherein the first RF repeater device comprises one or more first antenna arrays and one or more second antenna arrays antennas, and wherein the first RF repeater device has a first side facing substantially towards the source node and a second side that is opposite the first side and faces substantially towards the one or more destination nodes, and wherein the first RF repeater device is further configured to receive and transmit waveforms on each of the first side and the second side via different antenna arrays of the first RF repeater device.

12. The repeater system according to claim 1, wherein the first RF repeater device further comprises one or more first antenna arrays and one or more second antenna arrays, and wherein the first RF repeater device has a first side facing substantially towards the source node and a second side that is opposite the first side and faces substantially towards the one or more destination nodes, and wherein the first RF repeater device is further configured to receive and transmit waveforms on the first side via a same antenna array of the one or more first antenna arrays, and wherein the first RF repeater device is further configured to receive and transmit waveforms on the second side via a same antenna array of the one or more second antenna arrays, wherein the transmit and receive waveforms are non-overlapping.

13. The repeater system according to claim 1, wherein the first RF repeater device and the one or more second RF repeater devices in the network of RF repeater devices in the second topology are configured to operate at a first carrier frequency for inter-repeater signal propagation, and wherein the source node and the one or more destination nodes are configured to operate at a second carrier frequency.

14. The repeater system according to claim 1, wherein the source node is configured to operate at a first carrier frequency and the one or more destination nodes are configured to operate at a second carrier frequency, and wherein the first RF repeater device is further configured to control the one or more second RF repeater devices in the network of RF repeater devices to convert the first carrier frequency to the second carrier frequency to close a communication link.

15. A method implemented in a repeater system, the method comprising:
- detecting, by a first RF repeater device, a change in a network condition in a wireless network between a source node and one or more destination nodes, wherein the source node and one or more destination nodes are serviced by a network of RF repeater devices configured in a first topology; and
- based on the detected change in the network condition, controlling, by the first RF repeater device, one or more second RF repeater devices in the network of RF repeater devices to re-configure the first topology of the network of RF repeater devices to a second topology, wherein the re-configuration of the first topology of the network of RF repeater devices to the second topology is executed at least to continue to service the source node and the one or more destination nodes in the wireless network in the changed network condition.

16. The method according to claim 15, further comprising modifying a form of connectivity between the source node and the network of RF repeater devices for the re-configuration of the first topology of the network of RF repeater devices to the second topology.

17. The method according to claim 15, further comprising changing, by the first RF repeater device, an allocation of the first RF repeater device or the one or more second RF repeater devices to the one or more destination nodes for the re-configuration of the first topology of the network of RF repeater devices to the second topology.

18. The method according to claim 15, further comprising changing, by the first RF repeater device, an allocation of the first RF repeater device or the one or more second RF repeater devices to the source node for the re-configuration of the first topology of the network of RF repeater devices to the second topology.

19. The method according to claim 15, further comprising:
- establishing, by the first RF repeater device, a communicative coupling with a plurality of source nodes; and
- sharing, by the first RF repeater device, one or more phased array antenna and beamforming resources available within the first RF repeater device concurrently with the plurality of source nodes.

20. The method according to claim 15, further comprising operating, by the first RF repeater device, at different carrier frequency for incoming and outgoing waveforms.

* * * * *